US012637985B2

(12) United States Patent
Nakahara et al.

(10) Patent No.: US 12,637,985 B2
(45) Date of Patent: May 26, 2026

(54) METHOD FOR OPERATING GAS TURBINE EQUIPMENT, CONTROL DEVICE AND CONTROL PROGRAM FOR EXECUTING SAID OPERATING METHOD

(71) Applicant: MITSUBISHI HEAVY INDUSTRIES, LTD., Tokyo (JP)

(72) Inventors: Hisashi Nakahara, Tokyo (JP); Yosuke Eto, Tokyo (JP); Naoki Nakata, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/847,874

(22) PCT Filed: Jan. 24, 2023

(86) PCT No.: PCT/JP2023/002101
§ 371 (c)(1),
(2) Date: Sep. 17, 2024

(87) PCT Pub. No.: WO2023/181616
PCT Pub. Date: Sep. 28, 2023

(65) Prior Publication Data
US 2025/0215835 A1    Jul. 3, 2025

(30) Foreign Application Priority Data

Mar. 25, 2022    (JP) ................................. 2022-050338

(51) Int. Cl.
F02C 9/28        (2006.01)
F02C 7/22        (2006.01)
(Continued)

(52) U.S. Cl.
CPC .................. F02C 9/28 (2013.01); F02C 7/22 (2013.01); F02C 7/232 (2013.01); F02C 9/00 (2013.01);
(Continued)

(58) Field of Classification Search
CPC ...... F02C 9/00; F02C 9/28; F02C 9/40; F02C 7/232; F02C 7/22; F02C 9/287; F23R 3/28; F23R 3/36; F23N 2241/20
See application file for complete search history.

(56) References Cited

U.S. PATENT DOCUMENTS 3,325,994 A * 6/1967 Weehuizen ............... F02C 9/54
                                                        60/39.25
9,441,545 B2 * 9/2016 Harada ..................... F02C 9/40
(Continued)

FOREIGN PATENT DOCUMENTS

JP        2007-77867        3/2007
JP        2008-190402      8/2008

OTHER PUBLICATIONS

International Search Report issued Feb. 28, 2023 in International Application No. PCT/JP2023/002101, with English translation.
(Continued)

*Primary Examiner* — Jason H Duger
(74) *Attorney, Agent, or Firm* — Wenderoth, Lind & Ponack, L.L.P.

(57)        ABSTRACT

A device for controlling gas turbine equipment includes: a combustion load command generator configured to determine a combustion load command value, which is a parameter having a positive correlation with an inlet temperature; a flow rate ratio calculator configured to determine a flow rate ratio of fuel supplied to each of a plurality of types of nozzles of a combustor in accordance with the combustion load command value; and a valve opening degree calculator
(Continued)

configured to determine a valve opening degree of a fuel valve for each of the nozzles based on the flow rate ratio of the fuel supplied to each of the nozzles. The combustion load command generator has: a first load command calculation unit configured to determine the combustion load command value for a first fuel; and a second load command calculation unit configured to determine the combustion load command value for a second fuel.

6 Claims, 15 Drawing Sheets

(51) Int. Cl.

| | | |
|---|---|---|
| *F02C 7/232* | (2006.01) | |
| *F02C 9/00* | (2006.01) | |
| *F02C 9/40* | (2006.01) | |
| *F23R 3/28* | (2006.01) | |
| *F23R 3/36* | (2006.01) | |

(52) U.S. Cl.
CPC .................. *F02C 9/40* (2013.01); *F23R 3/28* (2013.01); *F23R 3/36* (2013.01); *F23N 2241/20* (2020.01)

(56) References Cited

U.S. PATENT DOCUMENTS

| 11,421,886 | B2 * | 8/2022 | Endo | F02C 7/228 |
|---|---|---|---|---|
| 2007/0079593 | A1 | 4/2007 | Fujii et al. | |
| 2007/0271024 | A1 * | 11/2007 | Fujii | G05B 13/024 |
| | | | | 701/100 |
| 2013/0232939 | A1 * | 9/2013 | Armstrong | B01J 8/062 |
| | | | | 60/39.23 |
| 2014/0230449 | A1 * | 8/2014 | Saito | F02C 9/50 |
| | | | | 60/734 |
| 2016/0326967 | A1 * | 11/2016 | Yamamoto | F23R 3/28 |
| 2017/0248083 | A1 * | 8/2017 | Fetvedt | F02C 9/263 |
| 2017/0292458 | A1 * | 10/2017 | Nakagawa | F02C 7/228 |
| 2018/0299131 | A1 * | 10/2018 | Endo | F23R 3/32 |
| 2022/0099033 | A1 * | 3/2022 | Hagita | F02C 9/40 |
| 2023/0258135 | A1 * | 8/2023 | Swann | F01D 11/24 |
| | | | | 60/39.281 |

OTHER PUBLICATIONS

Written Opinion of the International Searching Authority issued Feb. 28, 2023 in International Application No. PCT/JP2023/002101, with English translation.

* cited by examiner

METHOD FOR OPERATING GAS TURBINE EQUIPMENT, CONTROL DEVICE AND CONTROL PROGRAM FOR EXECUTING SAID OPERATING METHOD

CROSS-REFERENCE TO RELATED APPLICATION

Priority is claimed from Japanese Patent Application No. 2022-050338 filed on Mar. 25, 2022, the content of which is incorporated herein by reference.

TECHNICAL FIELD

The present disclosure relates to a method for operating gas turbine equipment, and a control device and a control program for executing the operating method.

BACKGROUND ART

A gas turbine includes a compressor that can compress air to generate compressed air, a combustor that can generate combustion gas by combusting a fuel in the compressed air, a turbine that can be driven by the combustion gas, and a fuel valve that regulates a flow rate of the fuel to be supplied to the combustor. The combustor includes a nozzle that injects the fuel.

Japanese Unexamined Patent Application Publication No. 2007-077867 discloses a gas turbine and a control method thereof. A combustor of the gas turbine includes a plurality of types of nozzles that inject a fuel such as a natural gas. A fuel valve that regulates a flow rate of the fuel flowing through each nozzle is provided for each of the plurality of types of nozzles.

According to the control method disclosed in Japanese Unexamined Patent Application Publication No. 2007-077867, a combustion load command value (CLCSO) which is a parameter having a positive correlation with a turbine inlet temperature is obtained from a viewpoint of protecting the gas turbine and stabilizing an output of the gas turbine, and a flow rate ratio of the fuel to be supplied to each of the plurality of types of nozzles is determined, based on the combustion load command value.

In addition, Japanese Unexamined Patent Application Publication No. 2008-190402 discloses a nozzle of a combustor that can inject a natural gas and an oil.

SUMMARY OF INVENTION

Technical Problem

In recent years, from a viewpoint of stable power supply, it is desirable that a plurality of types of fuels can be supplied to a gas turbine.

Therefore, an object of the present disclosure is to provide a technique in which a fuel can be stably combusted even when performance of a gas turbine is degraded when a plurality of types of fuels are used.

Solution to Problem

As an aspect for achieving the above-described object, a control device for gas turbine equipment is applied to the following gas turbine equipment.

This gas turbine equipment includes a gas turbine including a compressor configured to compress air to generate compressed air, a combustor configured to generate combustion gas by combusting a fuel in the compressed air, and a turbine configured to be driven by the combustion gas, and a plurality of types of fuel valves that regulate a flow rate of the fuel to be supplied to the combustor. The combustor includes a plurality of types of nozzles that inject the fuel. Each of the plurality of types of fuel valves is provided for each of the plurality of types of nozzles.

This control device includes a combustion load command generator that obtains a combustion load command value which is a parameter having a positive correlation with an inlet temperature which is a temperature of the combustion gas at an inlet of the turbine, a flow rate ratio calculator that obtains a flow rate ratio of the fuel to be supplied to each of the plurality of types of nozzles in accordance with the combustion load command value, a valve opening degree calculator that obtains a valve opening degree of the fuel valve for each of the plurality of types of nozzles, based on the flow rate ratio of the fuel to be supplied to each of the plurality of types of nozzles, and a control signal output unit that outputs a control signal indicating the valve opening degree to the fuel valve of each of the plurality of types of nozzles.

The combustion load command generator includes a first load command calculation unit that obtains the combustion load command value relating to a first fuel which is a fuel type indicated by a fuel type command from an outside, and a second load command calculation unit that obtains the combustion load command value relating to a second fuel which is a fuel type indicated by a fuel type command from the outside. Both the first load command calculation unit and the second load command calculation unit include a maximum temperature output calculation unit that obtains a maximum temperature output which is a scheduled output corresponding to the fuel type, with respect to an inlet maximum temperature which is a maximum temperature at which the inlet temperature is determined in advance, a minimum temperature output calculation unit that obtains a minimum temperature output which is a scheduled output corresponding to the fuel type, with respect to an inlet minimum temperature which is a minimum temperature at which the inlet temperature is determined in advance, a degradation coefficient calculation unit that obtains a degradation coefficient for correcting the maximum temperature output, a degradation correction unit that corrects the maximum temperature output by using the degradation coefficient, and a combustion load command value calculation unit that obtains the combustion load command value by using the minimum temperature output, a corrected maximum temperature output which is the maximum temperature output corrected by the degradation correction unit, and an actual output which is an actual output of the gas turbine. The degradation coefficient calculation unit includes a differentiator that obtains a deviation between the corrected maximum temperature output and the actual output, and a coefficient calculation unit that obtains the degradation coefficient in accordance with the deviation when temperature control is performed such that the inlet temperature is the inlet maximum temperature. The coefficient calculation unit includes a degradation parameter storage unit that stores a degradation parameter which is a value obtained by executing proportional integration processing on a ratio of a deviation when the deviation is equal to or greater than a predetermined threshold value during the temperature control. The coefficient calculation unit outputs the degradation coefficient, based on the degradation parameter stored in the degradation parameter storage unit.

In the present aspect, the combustion load command value can be obtained in view of performance degradation of the gas turbine in both a case of using the first fuel and a case of using the second fuel. Therefore, in the present aspect, the flow rate ratio for each of the plurality of fuel valves can be obtained in view of performance degradation of the gas turbine in both the case of using the first fuel and the case of using the second fuel. Therefore, in the present aspect, in both the case of using the first fuel and the case of using the second fuel, even when performance of the gas turbine is degraded, the fuel can be stably combusted.

In addition, in the present aspect, even immediately after the control device receives a fuel type command indicating a combustion type different from a fuel type at a current time point, the degradation coefficient can be obtained by using the degradation parameter stored in the degradation parameter storage unit. Therefore, in the present aspect, even immediately after the control device receives a new fuel type command, a degree of performance degradation of the gas turbine can be reflected in the degradation coefficient, and the fuel can be stably combusted.

As an aspect for achieving the above-described object, a control program for gas turbine equipment is applied to the following gas turbine equipment.

This gas turbine equipment includes a gas turbine including a compressor configured to compress air to generate compressed air, a combustor configured to generate combustion gas by combusting a fuel in the compressed air, and a turbine configured to be driven by the combustion gas, and a plurality of types of fuel valves that regulate a flow rate of the fuel to be supplied to the combustor. The combustor includes a plurality of types of nozzles that inject the fuel. Each of the plurality of types of fuel valves is provided for each of the plurality of types of nozzles.

This control program causes a computer to execute a process including a combustion load command generation step of obtaining a combustion load command value which is a parameter having a positive correlation with an inlet temperature which is a temperature of the combustion gas at an inlet of the turbine, a flow rate ratio calculation step of obtaining a flow rate ratio of the fuel to be supplied to each of the plurality of types of nozzles in accordance with the combustion load command value, a valve opening degree calculation step of obtaining a valve opening degree of the fuel valve for each of the plurality of types of nozzles, based on the flow rate ratio of the fuel to be supplied to each of the plurality of types of nozzles, and a control signal output step of outputting a control signal indicating the valve opening degree to the fuel valve of each of the plurality of types of nozzles.

The combustion load command generation step includes a first load command calculation step of obtaining the combustion load command value relating to a first fuel which is a fuel type indicated by a fuel type command from an outside, and a second load command calculation step of obtaining the combustion load command value relating to a second fuel which is a fuel type indicated by a fuel type command from the outside. Both the first load command calculation step and the second load command calculation step include a maximum temperature output calculation step of obtaining a maximum temperature output which is a scheduled output corresponding to the fuel type, with respect to an inlet maximum temperature which is a maximum temperature at which the inlet temperature is determined in advance, a minimum temperature output calculation step of obtaining a minimum temperature output which is a scheduled output corresponding to the fuel type, with respect to an inlet minimum temperature which is a minimum temperature at which the inlet temperature is determined in advance, a degradation coefficient calculation step of obtaining a degradation coefficient for correcting the maximum temperature output, a degradation correction step of correcting the maximum temperature output by using the degradation coefficient, and a combustion load command value calculation step of obtaining the combustion load command value by using the minimum temperature output, a corrected maximum temperature output which is a maximum temperature output corrected in the degradation correction step, and an actual output which is an actual output of the gas turbine. The degradation coefficient calculation step includes a deviation calculation step of obtaining a deviation between the corrected maximum temperature output and the actual output, and a coefficient calculation step of obtaining the degradation coefficient in accordance with the deviation when temperature control is performed such that the inlet temperature is the inlet maximum temperature. The coefficient calculation step includes a degradation parameter storage step of storing a degradation parameter which is a value obtained by executing proportional integration processing on a ratio of a deviation when the deviation is equal to or greater than a predetermined threshold value during the temperature control, in a degradation parameter storage unit which is a portion of a storage area of the computer. In the coefficient calculation step, the degradation coefficient is output, based on the degradation parameter stored in the degradation parameter storage unit.

Since the computer is caused to execute the control program of the present aspect, as in the control device in a first aspect, in both the case of using the first fuel and the case of using the second fuel, even when performance of the gas turbine is degraded, the fuel can be stably combusted.

Furthermore, since the computer is caused to execute the control program of the present aspect, as in the control device in the first aspect, even immediately after a new fuel type command is received, a degree of performance degradation of the gas turbine can be reflected in the degradation coefficient, and the fuel can be stably combusted.

As an aspect for achieving the above-described object, a method for operating gas turbine equipment is applied to the following gas turbine equipment.

This gas turbine equipment includes a gas turbine including a compressor configured to compress air to generate compressed air, a combustor configured to generate combustion gas by combusting a fuel in the compressed air, and a turbine configured to be driven by the combustion gas, and a plurality of types of fuel valves that regulate a flow rate of the fuel to be supplied to the combustor. The combustor includes a plurality of types of nozzles that inject the fuel. Each of the plurality of types of fuel valves is provided for each of the plurality of types of nozzles.

This operating method includes a combustion load command generation step of obtaining a combustion load command value which is a parameter having a positive correlation with an inlet temperature which is a temperature of the combustion gas at an inlet of the turbine, a flow rate ratio calculation step of obtaining a flow rate ratio of the fuel to be supplied to each of a plurality of types of nozzles in accordance with the combustion load command value, a valve opening degree calculation step of obtaining a valve opening degree of the fuel valve for each of the plurality of types of nozzles, based on the flow rate ratio of the fuel to be supplied to each of the plurality of types of nozzles, and a control signal output step of outputting a control signal indicating the valve opening degree to the fuel valve of each of the plurality of types of nozzles.

The combustion load command generation step includes a first load command calculation step of obtaining the combustion load command value relating to a first fuel which is a fuel type indicated by a fuel type command from an outside, and a second load command calculation step of obtaining the combustion load command value relating to a second fuel which is a fuel type indicated by a fuel type command from the outside. Both the first load command calculation step and the second load command calculation step include a maximum temperature output calculation step of obtaining a maximum temperature output which is a scheduled output corresponding to the fuel type, with respect to an inlet maximum temperature which is a maximum temperature at which the inlet temperature is determined in advance, a minimum temperature output calculation step of obtaining a minimum temperature output which is a scheduled output corresponding to the fuel type, with respect to an inlet minimum temperature which is a minimum temperature at which the inlet temperature is determined in advance, a degradation coefficient calculation step of obtaining a degradation coefficient for correcting the maximum temperature output, a degradation correction step of correcting the maximum temperature output by using the degradation coefficient, and a combustion load command value calculation step of obtaining the combustion load command value by using the minimum temperature output, a corrected maximum temperature output which is a maximum temperature output corrected in the degradation correction step, and an actual output which is an actual output of the gas turbine. The degradation coefficient calculation step includes a deviation calculation step of obtaining a deviation between the corrected maximum temperature output and the actual output, and a coefficient calculation step of obtaining the degradation coefficient in accordance with the deviation when temperature control is performed such that the inlet temperature is the inlet maximum temperature. The coefficient calculation step includes a degradation parameter storage step of storing a degradation parameter which is a value obtained by executing proportional integration processing on a ratio of a deviation when the deviation is equal to or greater than a predetermined threshold value during the temperature control, in a degradation parameter storage unit. In the coefficient calculation step, the degradation coefficient is output, based on the degradation parameter stored in the degradation parameter storage unit.

In the present aspect as well, as in the control device in the first aspect, in both the case of using the first fuel and the case of using the second fuel, even when performance of the gas turbine is degraded, the fuel can be stably combusted.

Furthermore, in the present aspect as well, as in the control device in the first aspect, even immediately after the new fuel type command is received, a degree of performance degradation of the gas turbine can be reflected in the degradation coefficient, and the fuel can be stably combusted.

Advantageous Effects of Invention

According to an aspect of the present disclosure, when a plurality of types of fuels are used, even when performance of a gas turbine is degraded, a fuel can be stably combusted.

BRIEF DESCRIPTION OF DRAWINGS

FIG. 2 is a cross-sectional view of a combustor in the embodiment according to the present disclosure.

FIG. 5 is a view for describing a functional configuration of the control device in the embodiment according to the present disclosure.

FIG. 12 is a graph for describing a function F3 in the embodiment according to the present disclosure.

FIG. 15 is a functional block diagram of a combustion load command generator in a first modification example according to the present disclosure.

DESCRIPTION OF EMBODIMENTS

Hereinafter, various embodiments according to the present disclosure will be described with reference to the drawings.

Embodiment of Gas Turbine Equipment

An embodiment of a control device according to the present disclosure and gas turbine equipment including the control device will be described with reference to FIGS. 1 to 14.

Figure 1:
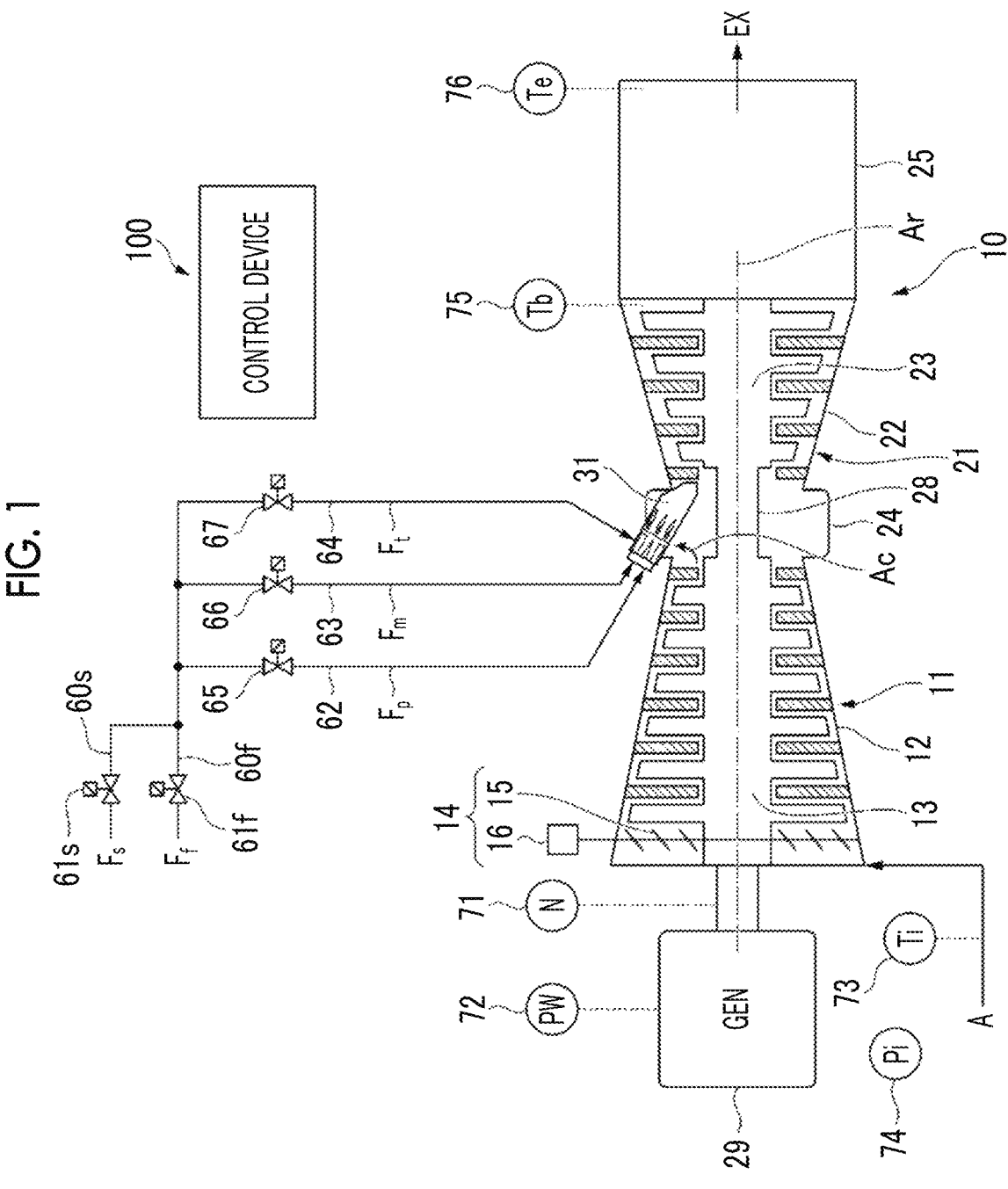
FIG. 1 is a schematic configuration diagram of gas turbine equipment in an embodiment according to the present disclosure.

As illustrated in FIG. 1, the gas turbine equipment of the present embodiment includes a gas turbine 10, a generator 29 that generates power by driving the gas turbine 10, a plurality of types of fuel valves 65, 66, and 67, a plurality of fuel switching valves 61f and 61s, and a control device 100 that controls an operation of the gas turbine 10.

The gas turbine 10 includes a compressor 11 that can compress air A to generate compressed air Ac, a combustor 31 that can generate combustion gas by combusting a fuel F in the compressed air Ac from the compressor 11, and a turbine 21 that can be driven by a high-temperature and high-pressure combustion gas.

The compressor 11 includes a compressor rotor 13 that rotates around an axis Ar, a compressor casing 12 that rotatably covers the compressor rotor 13, and an inlet guide vane (IGV) 14 provided at a suction port of the compressor casing 12. The IGV 14 includes a plurality of guide vanes 15 and a driver 16 that drives the plurality of guide vanes 15. The IGV 14 regulates a flow rate of the air to be suctioned into the compressor casing 12.

The turbine 21 includes a turbine rotor 23 that rotates around the axis Ar by means of the combustion gas from the combustor 31, and a turbine casing 22 that rotatably covers the turbine rotor 23. The turbine rotor 23 and the compressor rotor 13 are connected to each other to be rotatable around the same axis Ar, thereby forming a gas turbine rotor 28. A rotor of the generator 29 is connected to the gas turbine rotor 28.

The gas turbine 10 further includes an intermediate casing 24 and an exhaust casing 25. The intermediate casing 24 is disposed between the compressor casing 12 and the turbine casing 22 in an extending direction of the axis Ar, and connects the compressor casing 12 and the turbine casing 22. The compressed air Ac discharged from the compressor 11 flows into the intermediate casing 24. The exhaust casing 25 is disposed on a side opposite to a side on which the intermediate casing 24 is disposed, with reference to the turbine casing 22. An exhaust gas Ex which is the combustion gas exhausted from the turbine 21 flows into the exhaust casing 25.

Figure 2:
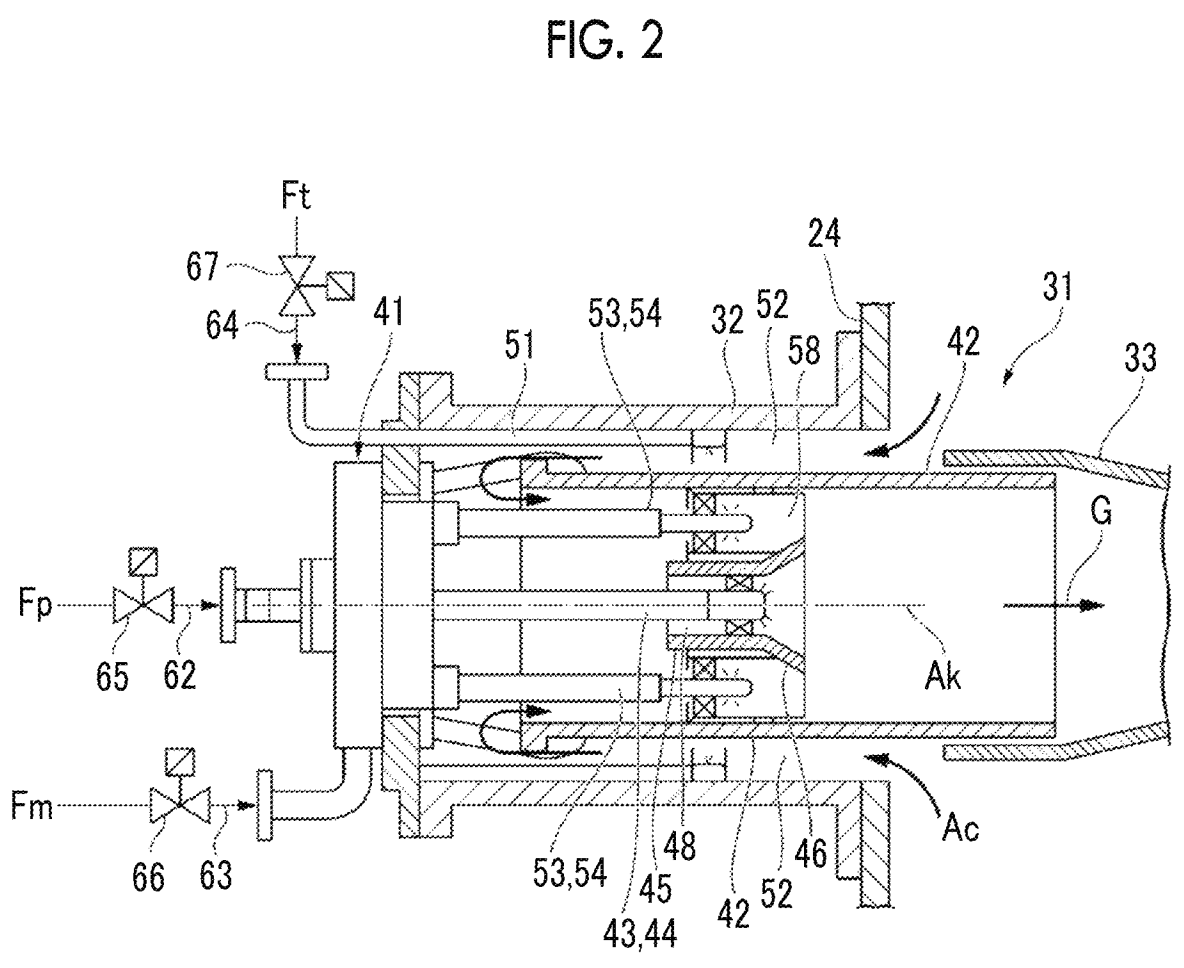

The combustor 31 is fixed to the intermediate casing 24. As illustrated in FIG. 2, the combustor 31 includes an outer cylinder 32 fixed to the intermediate casing 24, a combustion cylinder (or a transition piece) 33 that is disposed inside the intermediate casing 24, and that delivers the combustion gas into a combustion gas passage of the turbine 21, and a fuel nozzle 41 that injects the fuel and the air into the combustion cylinder 33.

Figure 3:
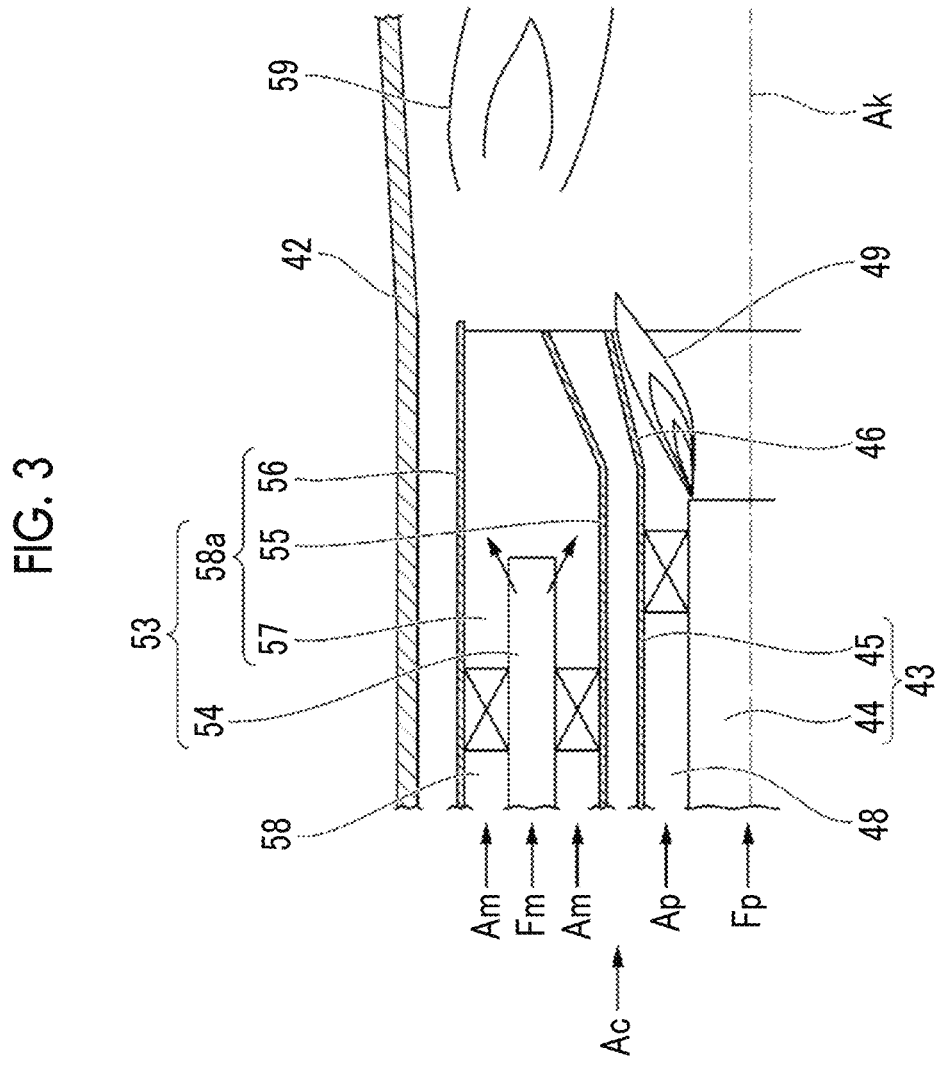
FIG. 3 is a cross-sectional view of a main part of the combustor in the embodiment according to the present disclosure.

As illustrated in FIGS. 2 and 3, the fuel nozzle 41 includes an inner cylinder 42, a pilot burner 43 disposed on a central axis Ak of the inner cylinder 42, a plurality of main burners 53 disposed around the pilot burner 43 at an equal interval in a circumferential direction, and a top hat nozzle 51 disposed on an inner peripheral side of the outer cylinder 32 and on an outer peripheral side of the inner cylinder 42. In the following description, a side to which a combustion gas G flows inside the combustion cylinder 33 in an extending direction of the central axis Ak of the inner cylinder 42 will be referred to as a downstream side, and a side opposite thereto will be referred to as an upstream side.

The pilot burner 43 includes a pilot nozzle 44 disposed on the central axis Ak of the inner cylinder 42, and a tubular pilot air cylinder 45 surrounding an outer periphery of the pilot nozzle 44. The downstream side of the pilot air cylinder 45 forms a pilot cone 46 whose diameter gradually increases toward the downstream side. An inner peripheral side of the pilot air cylinder 45 forms a pilot air flow path 48 through which the compressed air Ac from the compressor 11 flows as pilot air Ap. A pilot fuel Fp injected from the pilot nozzle 44 is combusted (diffusion combustion) in the pilot air Ap injected from the pilot air flow path 48, thereby forming a diffusion flame 49.

The main burner 53 includes a tubular main air inner cylinder 55 surrounding an outer periphery of the pilot air cylinder 45, a tubular main air outer cylinder 56 surrounding an outer periphery of the main air inner cylinder 55, partition plates 57 that divide an annular space between an outer peripheral side of the main air inner cylinder 55 and an inner peripheral side of the main air outer cylinder 56 into a plurality of spaces in the circumferential direction, and a main nozzle 54 disposed between a plurality of the partition plates 57. The plurality of spaces defined by the main air inner cylinder 55, the main air outer cylinder 56, and the plurality of partition plates 57 form a main air flow path 58 through which the compressed air Ac from the compressor 11 flows as main air Am. A main fuel Fm is injected to the main air Am flowing through the main air flow path 58, from the main nozzle 54 disposed inside the main air flow path 58. Therefore, a premixed gas in which the main air Am and the main fuel Fm are mixed flows to the downstream side of a tip (downstream end) of the main nozzle 54 inside the main air flow path 58. When the premixed gas flows out from the main air flow path 58, the premixed gas is combusted (premixed combustion) to form a premixed flame 59. The above-described diffusion flame 49 plays a role of holding the premixed flame 59.

A space between the inner peripheral side of the outer cylinder 32 and the outer peripheral side of the inner cylinder 42 forms a compressed air flow path 52 that guides the compressed air Ac from the compressor 11 into the inner cylinder 42. The top hat nozzle 51 injects a top hat fuel Ft into the compressed air flow path 52. Therefore, when the top hat fuel Ft is injected into the compressed air flow path 52, the top hat fuel Ft is mixed in the main air Am and the pilot air Ap.

As illustrated in FIG. 1, the gas turbine equipment of the present embodiment further includes a first fuel line 60f through which a first fuel Ff flows, a second fuel line 60s through which a second fuel Fs flows, an integrated fuel line 60 through which any one fuel of the first fuel Ff and the second fuel Fs flows, a pilot fuel line 62, a main fuel line 63, and a top hat fuel line 64. The first fuel line 60f and the second fuel line 60s are connected to one end of the integrated fuel line 60. The second fuel Fs is a fuel having a composition different from a composition of the first fuel Ff. For example, the first fuel Ff is a natural gas, and the second fuel Fs is an oil. All of the pilot fuel line 62, the main fuel line 63, and the top hat fuel line 64 are lines branched from the integrated fuel line 60. The pilot fuel line 62 is connected to the pilot nozzle 44. The main fuel line 63 is connected to the main nozzle 54. The top hat fuel line 64 is connected to the top hat nozzle 51.

As the plurality of fuel switching valves 61f and 61s, a first fuel switching valve 61f and a second fuel switching valve 61s are provided. The first fuel switching valve 61f is provided in the first fuel line 60f. The second fuel switching valve 61s is provided in the second fuel line 60s.

The plurality of types of fuel valves 65, 66, and 67 include a pilot fuel valve 65, a main fuel valve 66, and a top hat fuel valve 67. The pilot fuel valve 65 is provided in the pilot fuel line 62, and can regulate a flow rate of the fuel flowing through the pilot fuel line 62. The main fuel valve 66 is provided in the main fuel line 63, and can regulate a flow rate of the fuel flowing through the main fuel line 63. The top hat fuel valve 67 is provided in the top hat fuel line 64, and can regulate a flow rate of the fuel flowing through the top hat fuel line 64.

As illustrated in FIG. 1, the gas turbine equipment of the present embodiment further includes a rotation speed meter 71 that detects a rotation speed N of the gas turbine rotor 28, an output meter 72 that detects an output PW of the generator 29, an intake air temperature sensor 73 that detects an intake air temperature Ti which is a temperature of the air A suctioned by the compressor 11, an intake air pressure gauge 74 that detects an intake air pressure (atmospheric pressure) Pi which is a pressure of the air suctioned by the compressor 11, a blade path temperature sensor 75 that detects a blade path temperature Tb which is a temperature of the combustion gas immediately after a final stage of the turbine 21, and an exhaust gas temperature sensor 76 that detects an exhaust gas temperature Te inside the exhaust casing 25 on the downstream side of the final stage of the turbine 21. The output PW of the generator 29 which is detected by the output meter 72 is an actual output of the gas turbine 10.

Figure 4:
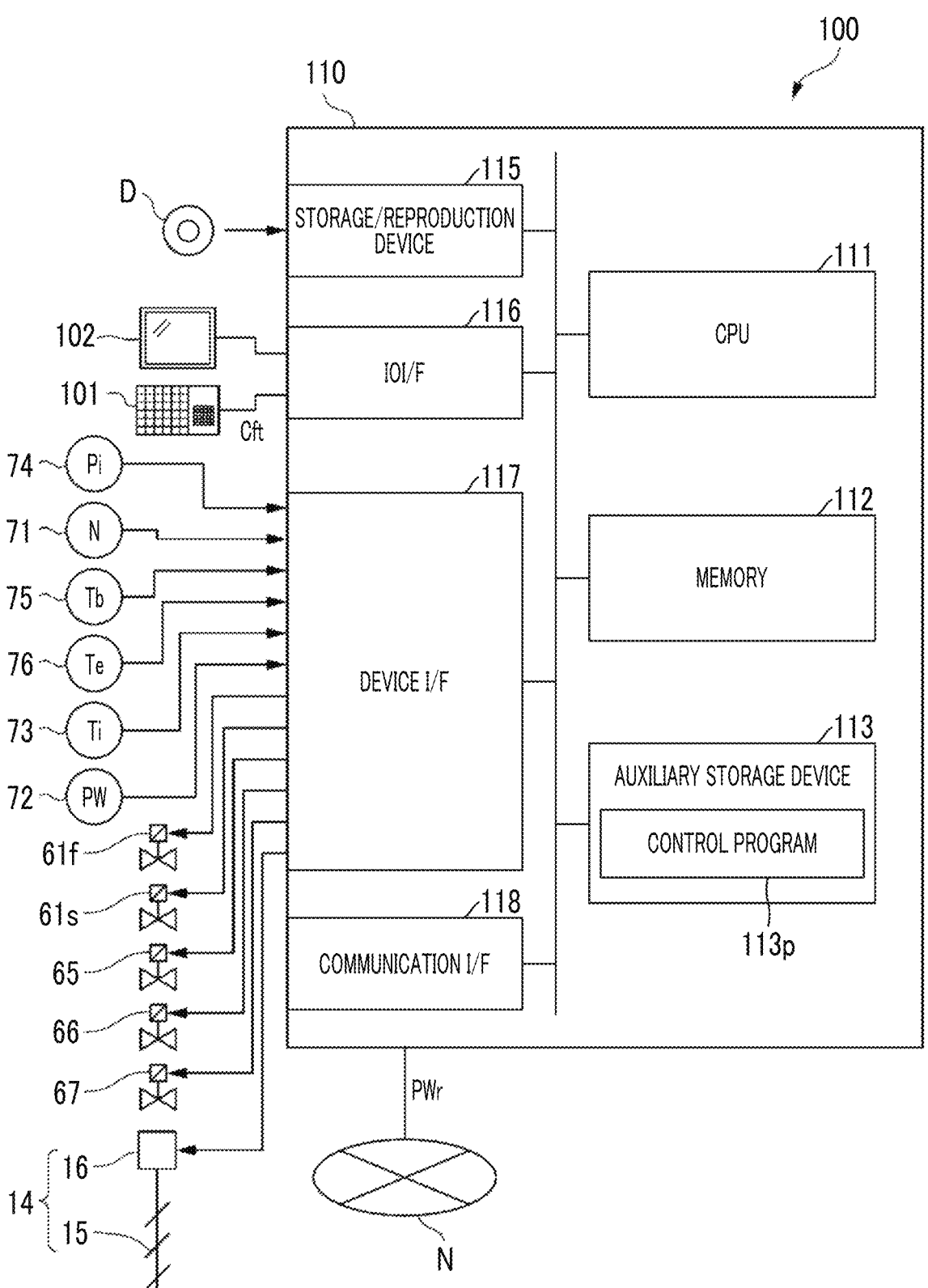
FIG. 4 is a view for describing a hardware configuration of a control device in the embodiment according to the present disclosure.

The control device 100 is a computer. As illustrated in FIG. 4, as hardware, the control device 100 includes a computer main body 110, an input device 101 such as a keyboard and a mouse, and a display device 102. The computer main body includes a central processing unit (CPU) 111 that performs various calculations, a main storage device 112 such as a memory which is a work area of the CPU 111, an auxiliary storage device 113 such as a hard disk drive device, a storage/reproduction device 115 that performs storage processing or reproduction processing of data on a disk-type storage medium D, an input/output interface 116 of the input device 101 and the display device 102, a device interface 117, and a communication interface 118 for communicating with an outside via a network N.

Each of the detectors 71 to 76 described above, the first fuel switching valve 61*f*, the second fuel switching valve 61*s*, each of the fuel valves 65, 66, and 67, and the IGV 14 are connected to the device interface 117 via a signal line or the like.

A control program 113*p* and the like are stored in the auxiliary storage device 113 in advance. For example, the control program 113*p* is incorporated into the auxiliary storage device 113 from the disk-type storage medium D via the storage/reproduction device 115. The control program 113*p* may be incorporated into the auxiliary storage device 113 from an external device via the communication interface 118. Each functional unit of the control device 100 to be described below functions in such a manner that the CPU 111 executes the control program 113*p* stored in the auxiliary storage device 113.

Figure 5:
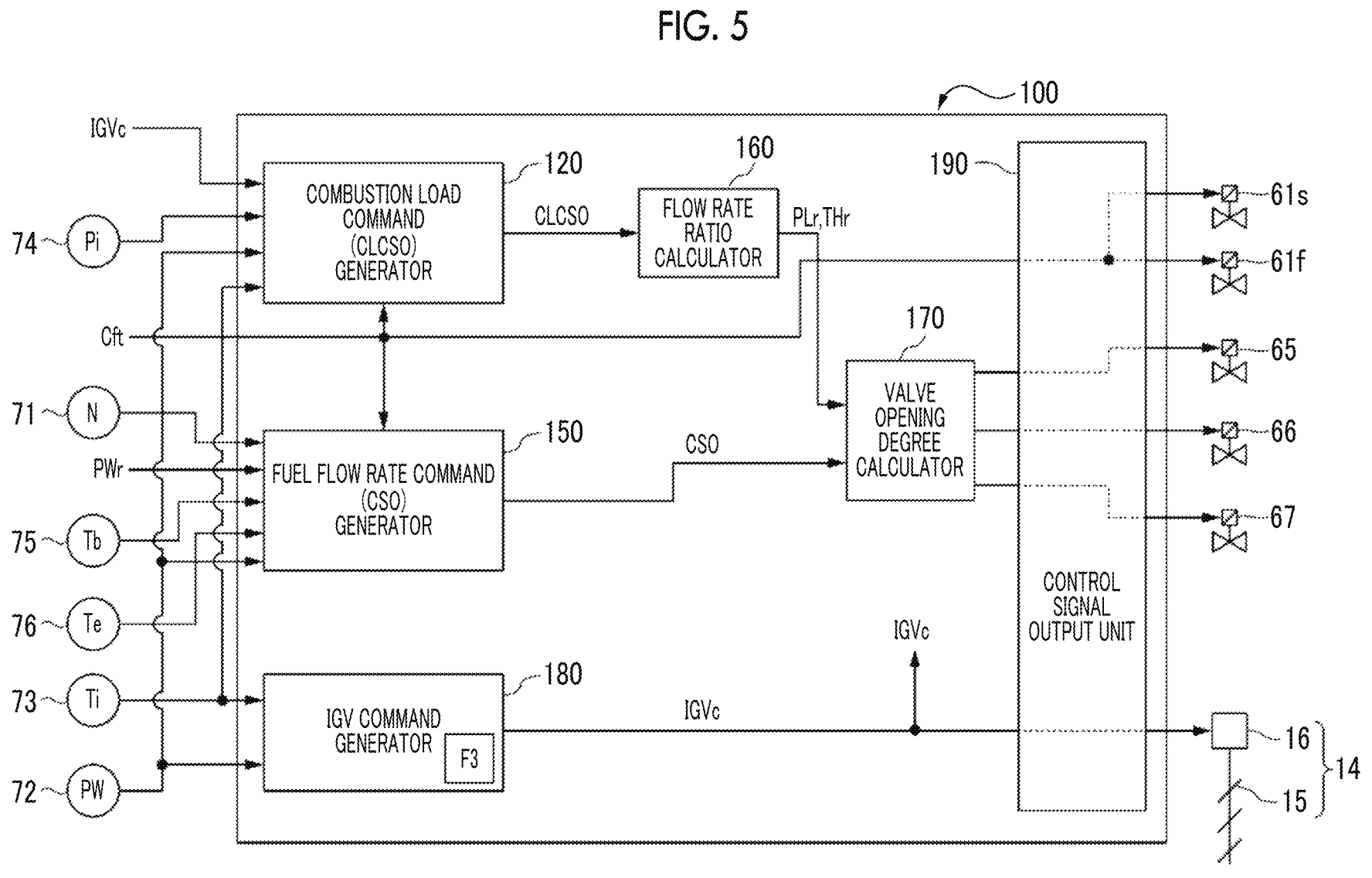

As illustrated in FIG. 5, the control device 100 functionally includes a combustion load command generator 120 that generates a combustion load command value CLCSO, a fuel flow rate command generator 150 that generates a fuel flow rate command value CSO, a flow rate ratio calculator 160 that calculates flow rate ratios (PLr and THr) of the fuel, a valve opening degree calculator 170 that obtains a valve opening degree of each of the fuel valves 65, 66, and 67, an IGV command generator 180 that generates an IGV command value IGVC indicating the opening degree of the IGV 14, and a control signal output unit 190 that outputs a control signal indicating a command value to a control target.

The combustion load command value CLCSO is a dimensionless parameter of a temperature of the combustion gas at an inlet of the turbine 21 (hereinafter, referred to as an inlet temperature), and is a parameter having a positive correlation with the inlet temperature. The combustion load command value CLCSO is set to be 0% when the inlet temperature is a lower limit value, and is set to be 100% when the inlet temperature is an upper limit value. For example, when the lower limit value of the inlet temperature (inlet minimum temperature) is 700° C. and the upper limit value of the inlet temperature (inlet maximum temperature) is 1,500° C., the combustion load command value CLCSO is expressed by the following equation.

$$CLCSO(\%) = \{(\text{Actual Output of Gas Turbine} - 700° \text{ C. } MW)/ \qquad (1)$$
$$(1{,}500° \text{ C. } MW - 700° \text{ C. } MW)\} \times 100$$

The actual output of the gas turbine is an actual gas turbine output detected by the output meter 72. The 700° C. MW is a scheduled gas turbine output when the inlet temperature is 700° C. which is the lower limit value. The 700° C. MW is the inlet minimum temperature output. The 1,500° C. MW is a scheduled gas turbine output when the inlet temperature is 1,500° C. which is the upper limit value. The 1,500° C. MW is the inlet maximum temperature output.

In the above description, the lower limit value of the inlet temperature of the combustion gas in the turbine 21 is 700° C., and the upper limit value is 1,500° C. However, depending on a model of the combustor 31 or the like, the lower limit value and the upper limit value of the inlet temperature of the combustion gas in the turbine 21 may be set to values different from those in the above-described example.

Figure 6:
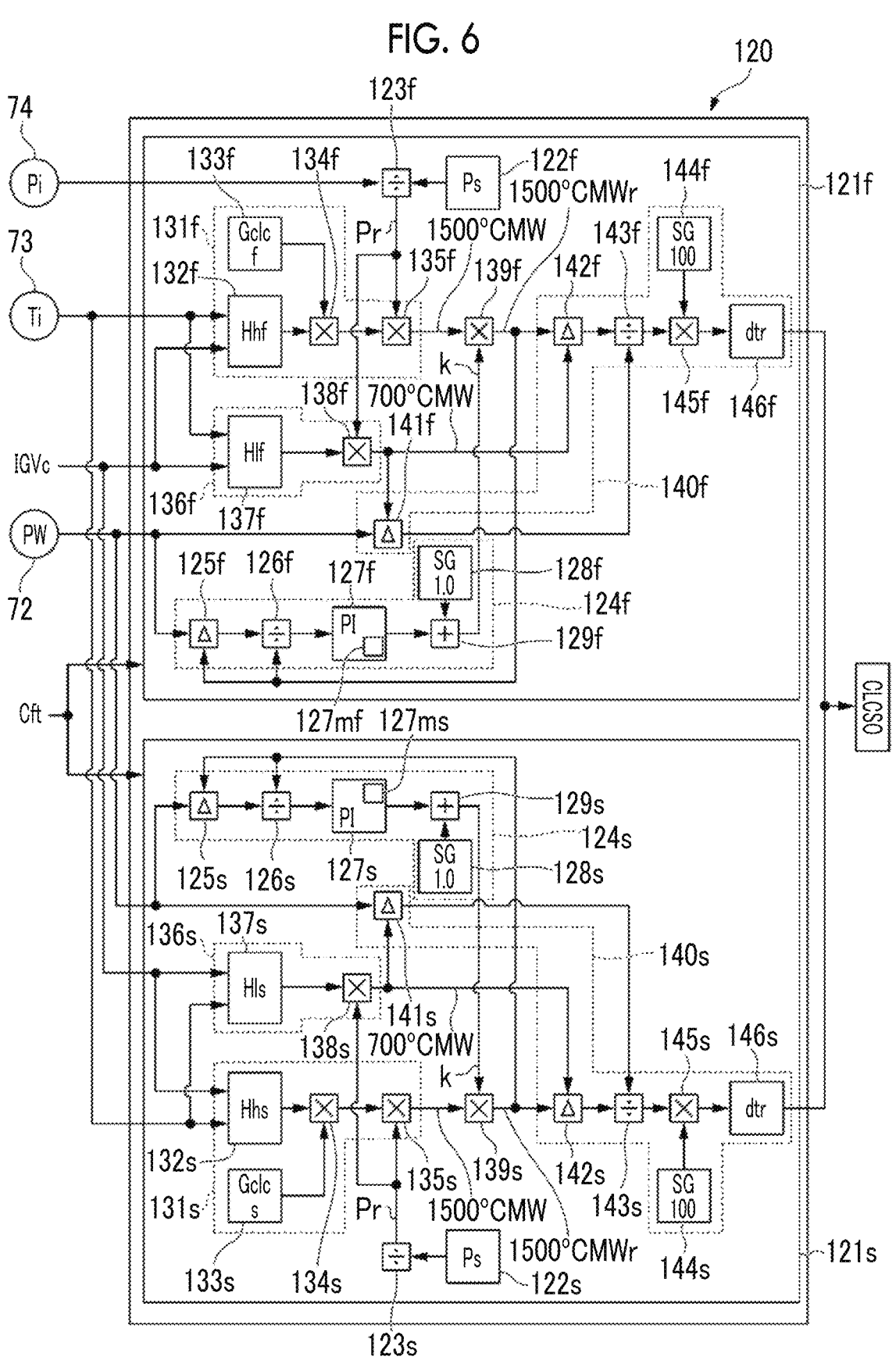
FIG. 6 is a functional block diagram of a combustion load command generator in the embodiment according to the present disclosure.

As illustrated in FIG. 6, the combustion load command generator 120 includes a first load command calculation unit 121*f* that generates the combustion load command value CLCSO corresponding to the first fuel Ff, and a second load command calculation unit 121*s* that generates the combustion load command value CLCSO corresponding to the second fuel Fs.

Both the first load command calculation unit 121*f* and the second load command calculation unit 121*s* include standard atmospheric pressure generators 122*f* and 122*s*, intake air pressure ratio calculation units 123*f* and 123*s*, degradation coefficient calculation units 124*f* and 124*s*, maximum temperature output calculation units 131*f* and 131*s*, minimum temperature output calculation units 136*f* and 136*s*, degradation correction units 139*f* and 139*s*, and combustion load command value calculation units 140*f* and 140*s*.

In components of the first load command calculation unit 121*f* and the second load command calculation unit 121*s* which are described above, components indicated by a symbol including "f" are components of the first load command calculation unit 121*f*, and components indicated by a symbol including "s" are components of the second load command calculation unit 121*s*.

The standard atmospheric pressure generators 122*f* and 122*s* generate a standard intake air pressure (standard atmospheric pressure) Ps. The intake air pressure ratio calculation units 123*f* and 123*s* obtain an intake air pressure ratio Pr which is a ratio of the intake air pressure (atmospheric pressure) Pi detected by the intake air pressure gauge 74 to the standard intake air pressure Ps.

The maximum temperature output calculation units 131*f* and 131*s* obtain the scheduled maximum temperature output 1,500° C. MW corresponding to the fuel type. The maximum temperature output calculation units 131*f* and 131*s* include planned maximum temperature output generators 132*f* and 132*s*, machine difference correction coefficient generators 133*f* and 133*s*, machine difference correctors 134*f* and 134*s*, and intake air pressure correctors 135*f* and 135*s*.

The planned maximum temperature output generators 132*f* and 132*s* obtain a planned maximum temperature output which is a planned gas turbine output when the inlet temperature is 1,500° C., by using the intake air temperature Ti and the IGV command value IGVc as variation parameters and by using functions Hhf and Hhs corresponding to the fuel type. The machine difference correction coefficient generators 133*f* and 133*s* generate a machine difference correction coefficient. The machine difference correction coefficient (gain) is a ratio of the gas turbine output when the inlet temperature in the actual gas turbine is 1,500° C. to the planned maximum temperature output. The machine difference correction coefficient is obtained during atrial operation of an actual gas turbine or the like. The machine difference correctors 134*f* and 134*s* are multipliers that correct the planned maximum temperature output by multiplying the planned maximum temperature output by the machine difference correction coefficient (gain). The intake air pressure correctors 135*f* and 135*s* are multipliers that further correct the planned maximum temperature output after machine difference correction by multiplying the planned maximum temperature output after the machine difference correction by the intake air pressure ratio Pr. The output from the intake air pressure correctors 135*f* and 135*s* is the scheduled maximum temperature output 1,500° C. MW corresponding to the fuel type.

The minimum temperature output calculation units 136*f* and 136*s* obtain the scheduled minimum temperature output 700° C. MW corresponding to the fuel type. The minimum temperature output calculation units 136*f* and 136*s* include planned minimum temperature output generators 137*f* and 137*s* and intake air pressure correctors 138*f* and 138*s*.

The planned maximum temperature output generators 132*f* and 132*s* obtain the planned minimum temperature output which is a design gas turbine output when the inlet temperature is 700° C., by using the intake air temperature Ti and the IGV command value IGVc as variation parameters and by using a function Hl corresponding to the fuel type. The intake air pressure correctors 138*f* and 138*s* are multipliers that correct the planned minimum temperature output by multiplying the planned minimum temperature output by the intake air pressure ratio Pr. The output from the intake air pressure correctors 138*f* and 138*s* is the above-described scheduled minimum temperature output 700° C. MW corresponding to the fuel type.

The degradation coefficient calculation units 124*f* and 124*s* obtain a degradation coefficient k indicating a degree of output degradation of the gas turbine 10 which is caused by using the gas turbine 10. The degradation correction units 139*f* and 139*s* are multipliers that correct the maximum temperature output 1,500° C. MW by multiplying the maximum temperature output 1,500° C. MW which is an output from the maximum temperature output calculation units 131*f* and 131*s* by the degradation coefficient k. The maximum temperature output corrected by the degradation correction units 139*f* and 139*s* is a corrected maximum temperature output 1,500° C. MWr.

The degradation coefficient calculation units 124*f* and 124*s* include differentiators 125*f* and 125*s* that obtain a deviation A between the actual output and the corrected maximum temperature output 1,500° C. MWr, dividers 126*f* and 126*s* that obtain a ratio of the deviation A to the corrected maximum temperature output 1,500° C. MWr, proportional integrators 127*f* and 127*s* that obtain a degradation parameter pm which is a value obtained by executing proportional integration processing on the output from the dividers 126*f* and 126*s*, fixed value generators 128*f* and 128*s* that generate a fixed value of 1.0, and adders 129*f* and 129*s* that add a fixed value to the degradation parameter pm from the proportional integrators 127*f* and 127*s*. The proportional integrators 127*f* and 127*s* include degradation parameter storage units 127*mf* and 127*ms*. The degradation parameter storage units 127*mf* and 127*ms* are secured in a portion of the main storage device 112 such as a memory illustrated in FIG. 4. The proportional integrators 127*f* and 127*s* store the degradation parameter pm which is a value obtained by executing proportional integration processing on the output from the dividers 126*f* and 126*s*, in the degradation parameter storage units 127*mf* and 127*ms*, and output the degradation parameter pm. The degradation coefficient calculation units 124*f* and 124*s* output the output from the adders 129*f* and 129*s* as the degradation coefficient k.

In the present embodiment, the dividers 126*f* and 126*s*, the proportional integrators 127*f* and 127*s*, the fixed value generators 128*f* and 128*s*, and the adders 129*f* and 129*s* in the degradation coefficient calculation units 124*f* and 124*s* form the coefficient calculation units of the degradation coefficient calculation units 124*f* and 124*s*. When temperature control is performed such that the inlet temperature is the inlet maximum temperature, the proportional integrators 127*f* and 127*s* included in the coefficient calculation unit obtain the above-described degradation parameter pm, and store the degradation parameter pm in the degradation parameter storage units 127*mf* and 127*ms*. For example, when the actual output which is the actual output of the gas turbine 10 detected by the output meter 72 is 90 MW and the corrected maximum temperature output 1,500° C. MWr is 100 MW, the differentiators 125*f* and 125*s* execute the calculation of (90-100), and output −10 MW. The dividers 126*f* and 126*s* output −0.1 by dividing −10 MW which is the output from the differentiators 125*f* and 125*s* by 100 MW which is the corrected maximum temperature output 1,500° C. MWr. When the temperature control is performed such that the inlet temperature is the inlet maximum temperature, the proportional integrators 127*f* and 127*s* obtain the above-described degradation parameter pm, and store the degradation parameter pm in the degradation parameter storage units 127*mf* and 127*ms*. For example, when the degradation parameter pm obtained by the proportional integrator 127*f* or 127*s* is also set to −0.1, the adders 129*f* and 129*s* add a fixed value 1.0 from the fixed value generator 128*f* or 128*s* to the degradation parameter pm (−0.1), and output 0.9 which is as an addition result, as the degradation coefficient k.

The combustion load command value calculation units 140*f* and 140*s* include first differentiators 141*f* and 141*s*, second differentiators 142*f* and 142*s*, dividers 143*f* and 143*s*, fixed value generators 144*f* and 144*s* that generate a fixed value of 100, multipliers 145*f* and 145*s*, and limiters 146*f* and 146*s*.

The first differentiators 141*f* and 141*s* obtain a deviation between the actual output and the minimum temperature output 700° C. MW. The first differentiators 141*f* and 141*s* obtain a value of a numerator in the above-described Equation (1). The second differentiators 142*f* and 142*s* obtain a deviation between the corrected maximum temperature output 1,500° C. MWr and the minimum temperature output 700° C. MW. The second differentiators 142*f* and 142*s* obtain a value of a denominator of the above-described Equation (1). The dividers 143*f* and 143*s* divide the value of the numerator in the above-described Equation (1) which is the output from the first differentiators 141*f* and 141*s* by the value of the denominator in the above-described equation (1) which is the output from the second differentiators 142*f* and 142*s*. The multipliers 145*f* and 145*s* multiply the output from the dividers 143*f* and 143*s* by 100 from the fixed value generators 144*f* and 144*s*, and output a result thereof as the combustion load command value CLCSO. The limiters 146*f* and 146*s* limit an increase/decrease rate of the combustion load command value CLCSO such that the increase/decrease rate which is a change amount per unit time of the combustion load command value CLCSO from the multipliers 145*f* and 145*s* is equal to or smaller than a predetermined value.

The machine difference correction coefficient generator 133*f* of the first load command calculation unit 121*f* and the machine difference correction coefficient generator 133*s* of the second load command calculation unit 121*s* are different from each other. The machine difference correction coefficient generator 133*f* of the first load command calculation unit 121*f* generates the machine difference correction coefficient obtained when a trial operation of the gas turbine 10 is performed by using the first fuel Ff. In addition, the machine difference correction coefficient generator 133*s* of the second load command calculation unit 121*s* generates the machine difference correction coefficient obtained when the trial operation of the gas turbine 10 is performed by using the second fuel Fs. The planned maximum temperature output generator 132*f* of the first load command calculation unit 121*f* and the planned maximum temperature output generator 132*s* of the second load command calculation unit 121*s* are different from each other. The planned maximum temperature output generator 132*f* of the first load command calculation unit 121*f* obtains the planned maximum temperature output when the inlet temperature is 1,500° C., by using the function Hhf corresponding to the first fuel Ff, and generates the planned maximum temperature output. The planned minimum temperature output generator 137*f* of the first load command calculation unit 121*f* and the planned minimum temperature output generator 137*s* of the second load command calculation unit 121*s* are different from each other. The planned minimum temperature output generator 137*f* of the first load command calculation unit 121*f* obtains the planned minimum temperature output when the inlet temperature is 700° C., by using a function Hlf corresponding to the first fuel Ff, and generates the planned minimum temperature output. The planned minimum temperature output generator 137*s* of the second load command calculation unit 121*s* obtains the planned minimum temperature output when the inlet temperature is 700° C., by using a function Hls corresponding to the second fuel Fs, and generates the planned minimum temperature output.

Figure 7:
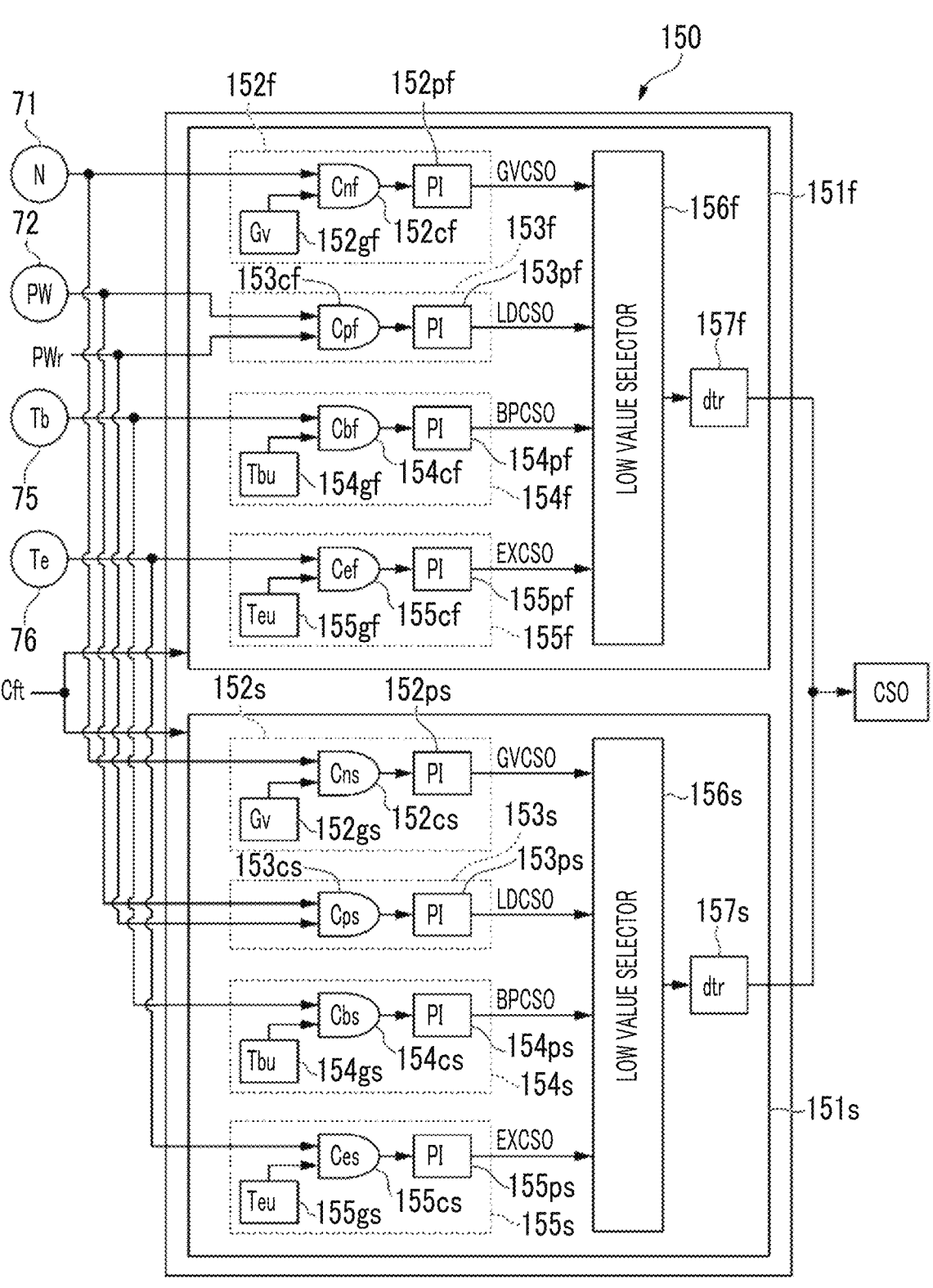
FIG. 7 is a functional block diagram of a fuel flow rate command generator in the embodiment according to the present disclosure.

The fuel flow rate command value CSO is a value indicating a total flow rate of the fuel to be supplied to the combustor 31 (hereinafter, referred to as a total fuel flow rate). Therefore, the fuel flow rate command generator 150 obtains the total fuel flow rate. As illustrated in FIG. 7, the fuel flow rate command generator 150 includes a first fuel flow rate command calculation unit 151*f* that generates the fuel flow rate command value CSO corresponding to the first fuel Ff, and a second fuel flow rate command calculation unit 151*s* that generates the fuel flow rate command value CSO corresponding to the second fuel Fs.

Both the first fuel flow rate command calculation unit 151*f* and the second fuel flow rate command calculation unit 151*s* include governor controllers 152*f* and 152*s*, load controllers 153*f* and 153*s*, blade path temperature controllers 154*f* and 154*s*, exhaust gas temperature controllers 155*f* and 155*s*, low value selectors 156*f* and 156*s*, and limiters 157*f* and 157*s*. In components of the first fuel flow rate command calculation unit 151*f* and the second fuel flow rate command calculation unit 151*s* which are described above, a component indicated by a symbol including "f" is a component of the first fuel flow rate command calculation unit 151*f*, and a component indicated by a symbol including "s" is a component of the second fuel flow rate command calculation unit 151*s*.

The governor controllers 152*f* and 152*s* include target rotation speed generators 152*gf* and 152*gs* that generate a target rotation speed Nt, rotation speed comparators 152*cf* and 152*cs* that compare the rotation speed N of the gas turbine rotor 28 from the rotation speed meter 71 with the target rotation speed Nt, and output a comparison value corresponding to the fuel type, and proportional integrators 152*pf* and 152*ps* that execute proportional integration calculation on the comparison value from the rotation speed comparators 152*cf* and 152*cs*. The governor controllers 152*f* and 152*s* output the output from the proportional integrators 152*pf* and 152*ps* as a command value GVCSO. The command value GVCSO is a command value indicating the total fuel flow rate for setting the rotation speed N of the gas turbine rotor 28 to the target rotation speed Nt.

The load controllers 153*f* and 153*s* include output comparators 153*cf* and 153*cs* that compare an actual output PW of the gas turbine 10 from the output meter 72 with a required output PWr for the gas turbine 10 from a higher-level control device, and output the comparison value corresponding to the fuel type, and proportional integrators 153*pf* and 153*ps* that execute proportional integration calculation on the comparison value from the output comparators 153*cf* and 153*cs*. The load controllers 153*f* and 153*s* output the output from the proportional integrators 153*pf* and 153*ps* as a command value LDCSO. The command value LDCSO is a command value indicating the total fuel flow rate for setting the actual output PW to the required output PWr.

The blade path temperature controllers 154*f* and 154*s* include upper limit value generators 154*gf* and 154*gs* that generate an upper limit value Thu of a blade path temperature, blade path temperature comparators 154*cf* and 154*cs* that compare a blade path temperature Tb from the blade path temperature sensor 75 with the upper limit value Tbu, and output a comparison value corresponding to the fuel type, and proportional integrators 154*pf* and 154*ps* that execute proportional integration calculation on the comparison value from the blade path temperature comparators 154*cf* and 154*cs*. The blade path temperature controllers 154*f* and 154*s* output the output from the proportional integrators 154*pf* and 154*ps* as a command value BPCSO. The command value BPCSO is a command value indicating the total fuel flow rate for preventing the blade path temperature Tb from exceeding the upper limit value Tbu.

The exhaust gas temperature controllers 155*f* and 155*s* include upper limit value generators 155*gf* and 155*gs* that generate an upper limit value Teu of an exhaust gas temperature, exhaust gas temperature comparators 155*cf* and 155*cs* that compare the exhaust gas temperature Te from the exhaust gas temperature sensor 76 with the upper limit value Teu, and output a comparison value corresponding to the fuel type, and proportional integrators 155*pf* and 155*ps* that execute proportional integration calculation on the comparison value from the exhaust gas temperature comparators 155*cf* and 155*cs*. The exhaust gas temperature controllers 155*f* and 155*s* output the output from the proportional integrators 155*pf* and 155*ps* as a command value EXCSO. The command value EXCSO is a command value indicating the total fuel flow rate for preventing the exhaust gas temperature Te from exceeding the upper limit value Teu.

The rotation speed comparator 152*cf* of the first fuel flow rate command calculation unit 151*f* and the rotation speed comparator 152*cs* of the second fuel flow rate command calculation unit 151*s* are different from each other. The rotation speed comparator 152*cf* of the first fuel flow rate command calculation unit 151*f* outputs a comparison value corresponding to the first fuel Ff, and the rotation speed comparator 152cs of the second fuel flow rate command calculation unit 151s outputs a comparison value corresponding to the second fuel Fs. The output comparator 153cf of the first fuel flow rate command calculation unit 151f and the output comparator 153cs of the second fuel flow rate command calculation unit 151s are different from each other. The output comparator 153cf of the first fuel flow rate command calculation unit 151f outputs a comparison value corresponding to the first fuel Ff, and the output comparator 153cs of the second fuel flow rate command calculation unit 151s outputs a comparison value corresponding to the second fuel Fs. The blade path temperature comparator 154cf of the first fuel flow rate command calculation unit 151f and the blade path temperature comparator 154cs of the second fuel flow rate command calculation unit 151s are different from each other. The blade path temperature comparator 154cf of the first fuel flow rate command calculation unit 151f outputs a comparison value corresponding to the first fuel Ff, and the blade path temperature comparator 154cs of the second fuel flow rate command calculation unit 151s outputs a comparison value corresponding to the second fuel Fs. The exhaust gas temperature comparator 155cf of the first fuel flow rate command calculation unit 151f and the exhaust gas temperature comparator 155cs of the second fuel flow rate command calculation unit 151s are different from each other. The exhaust gas temperature comparator 155cf of the first fuel flow rate command calculation unit 151f outputs a comparison value corresponding to the first fuel Ff. and the exhaust gas temperature comparator 155cs of the second fuel flow rate command calculation unit 151s outputs a comparison value corresponding to the second fuel Fs.

The low value selectors 156f and 156s select a command value indicating a smallest fuel flow rate from the command value GVCSO, the command value LDCSO, the command value BPCSO, and the command value EXCSO, and output a command value thereof as a fuel flow rate command value CSO. The limiters 157f and 157s limit the increase/decrease rate of the fuel flow rate command value CSO such that the increase/decrease rate which is a change amount per unit time of the fuel flow rate command value CSO from the low value selectors 156f and 156s is equal to or smaller than a predetermined value.

Figure 8:
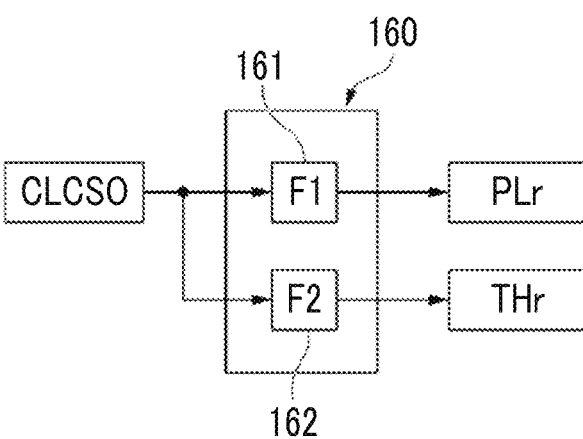
FIG. 8 is a functional block diagram of a flow rate ratio calculator in the embodiment according to the present disclosure.

As illustrated in FIG. 8, the flow rate ratio calculator 160 obtains a pilot ratio PLr which is a ratio of a pilot fuel flow rate Fpf to the total fuel flow rate, and a top hat ratio THr which is a ratio of a top hat fuel flow rate Ftf to the total fuel flow rate. The flow rate ratio calculator 160 includes a pilot ratio calculator 161 and a top hat ratio calculator 162.

Figure 10:
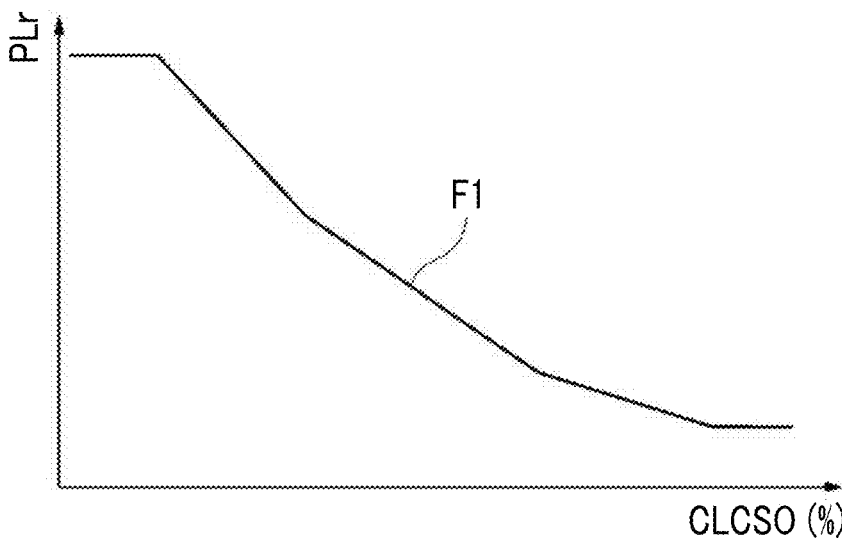
FIG. 10 is a graph for describing a function F1 in the embodiment according to the present disclosure.

The pilot ratio calculator 161 has a function F1 that defines a relationship between the combustion load command value CLCSO having a positive correlation with the inlet temperature of the combustion gas in the turbine 21 and the pilot ratio PLr. As illustrated in FIG. 10, the function F1 is a function in which the pilot ratio PLr gradually decreases as the combustion load command value CLCSO increases, that is, as the inlet temperature of the combustion gas increases. The pilot ratio calculator 161 receives the combustion load command value CLCSO from the combustion load command generator 120. The pilot ratio calculator 161 obtains the pilot ratio PLr corresponding to the combustion load command value CLCSO by using the function F1. Here, the relationship between the combustion load command value CLCSO and the pilot ratio PLr is defined by the function F1, but the relationship may be defined by a map.

Figure 11:
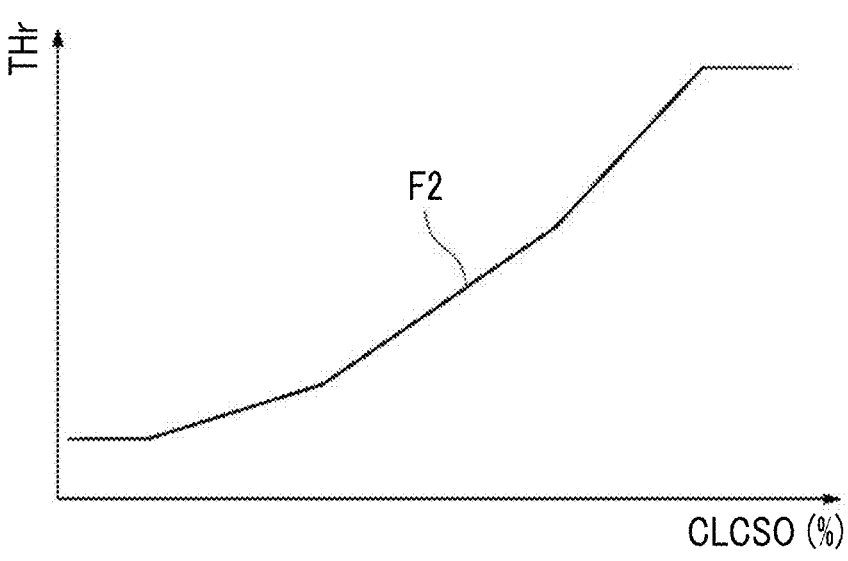
FIG. 11 is a graph for describing a function F2 in the embodiment according to the present disclosure.

The top hat ratio calculator 162 has a function F2 that defines a relationship between the combustion load command value CLCSO having a positive correlation with the inlet temperature of the combustion gas in the turbine 21 and the top hat ratio THr. As illustrated in FIG. 11, the function F2 is a function in which the top hat ratio THr gradually increases as the combustion load command value CLCSO increases, that is, as the inlet temperature of the combustion gas increases. The top hat ratio calculator 162 receives the combustion load command value CLCSO from the combustion load command generator 120. The top hat ratio calculator 162 obtains the top hat ratio THr corresponding to the combustion load command value CLCSO by using the function F2. Here, the relationship between the combustion load command value CLCSO and the top hat ratio THr is defined by the function F2, but the relationship may be defined by a map.

Figure 9:
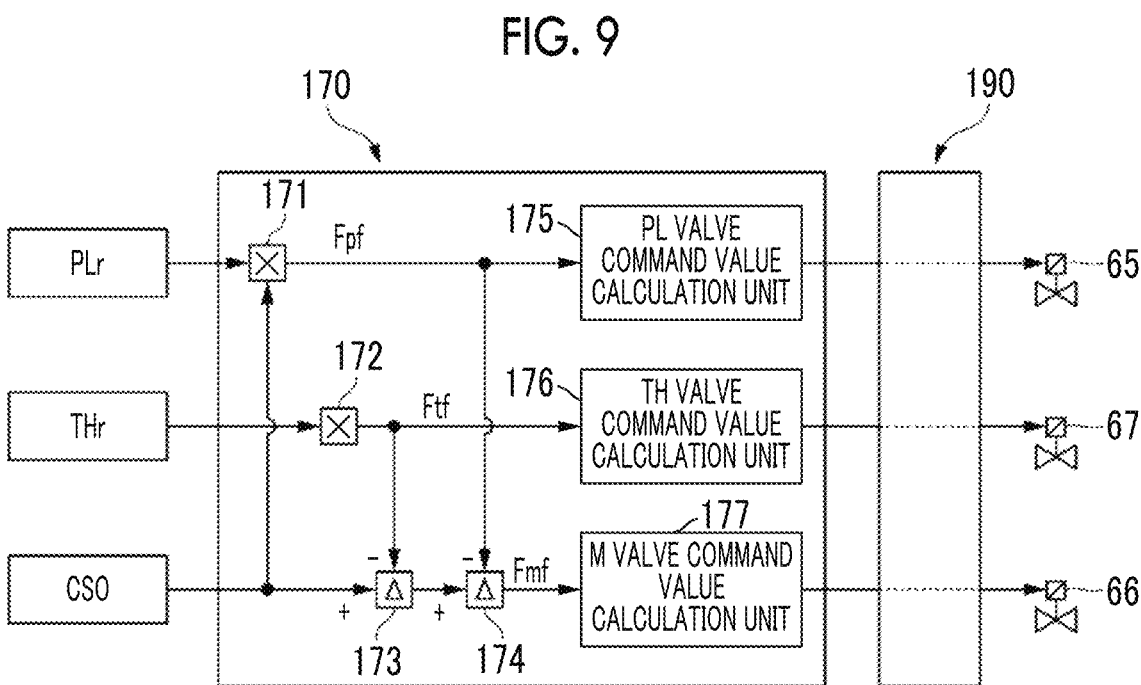
FIG. 9 is a functional block diagram of a valve opening degree calculator in the embodiment according to the present disclosure.

As illustrated in FIG. 9, the valve opening degree calculator 170 includes a first multiplier 171, a second multiplier 172, a first subtractor 173, a second subtractor 174, a PL valve command value calculation unit 175, a TH valve command value calculation unit 176, and an M valve command value calculation unit 177.

The first multiplier 171 obtains the pilot fuel flow rate Fpf by multiplying the fuel flow rate command value CSO indicating the total fuel flow rate by the pilot ratio PLr. The PL valve command value calculation unit 175 obtains a valve opening degree of the pilot fuel valve 65 such that the flow rate of the pilot fuel Fp injected from the pilot nozzle 44 is the pilot fuel flow rate Fpf, and outputs a command value indicating the valve opening degree.

The second multiplier 172 obtains the top hat fuel flow rate Ftf by multiplying the fuel flow rate command value CSO indicating the total fuel flow rate by the top hat ratio THr. The TH valve command value calculation unit 176 obtains the valve opening degree of the top hat fuel valve 67 such that the flow rate of the top hat fuel Ft injected from the top hat nozzle 51 is the top hat fuel flow rate Ftf, and outputs a command value indicating the valve opening degree.

The first subtractor 173 subtracts the top hat fuel flow rate Ftf from the fuel flow rate command value CSO indicating the total fuel flow rate. The second subtractor 174 further subtracts the pilot fuel flow rate Fpf from a subtraction result of the first subtractor 173, and outputs the subtraction result to the M valve command value calculation unit 177, as a main fuel flow rate Fmf. The M valve command value calculation unit 177 obtains a valve opening degree of the main fuel valve 66 such that a total flow rate of the main fuel Fm injected from a plurality of main nozzles 54 is the main fuel flow rate Fmf, and outputs a command value indicating the valve opening degree.

Figure 12:
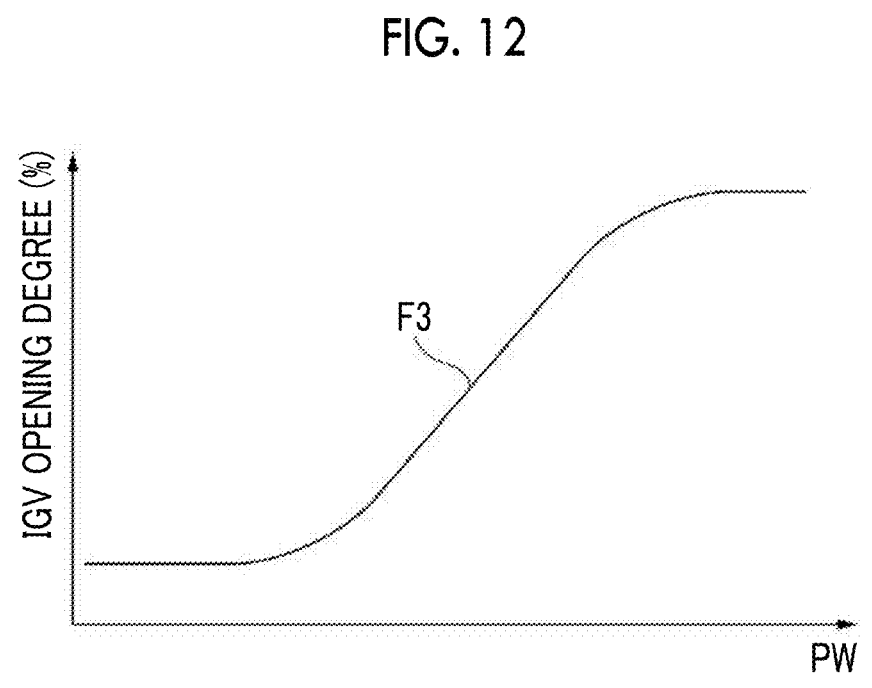

As illustrated in FIG. 5, the intake air temperature Ti from the intake air temperature sensor 73 and the output PW from the output meter 72 are input to the IGV command generator 180. The IGV command generator 180 has a function F3 indicating a relationship between the output of the gas turbine 10 and an IGV opening degree. As illustrated in FIG. 12, the function F3 is a function in which the IGV opening degree gradually increases as the output PW of the gas turbine 10 increases. The IGV command generator 180 first corrects the output PW from the output meter 72 with the intake air temperature Ti. Next, the IGV command generator 180 obtains the IGV opening degree with respect to the output PW corrected with the intake air temperature Ti by using the function F3. Here, a relationship between the output of the gas turbine 10 and the IGV opening degree is defined by the function F3, but the relationship may be defined by a map. The IGV command generator 180 outputs the IGV command value IGVc indicating the IGV opening degree to the combustion load command generator 120, the fuel flow rate command generator 150, and the control signal output unit 190. As described above, the combustion load command generator 120 generates the combustion load command value CLCSO by using the IGV command value IGVc. As described above, the fuel flow rate command generator 150 generates the fuel flow rate command value CSO by using the IGV command value IGVc.

The control signal output unit 190 prepares a control signal indicating the valve opening degree command value for each of the fuel valves 65, 66, and 67 obtained by the valve opening degree calculator 170. The control signal output unit 190 outputs the control signal for each of the fuel valves 65, 66, and 67 to the corresponding fuel valves 65, 66, and 67. In addition, the control signal output unit 190 prepares a control signal indicating the IGV command value IGVc output by the IGV command generator 180. The control signal output unit 190 outputs the control signal to the IGV 14. When the control signal output unit 190 receives a fuel type command Cft indicating the fuel type different from the fuel type at a current time point, the control signal output unit 190 outputs the control signal indicating switching of opening/closing states of each of the fuel valves 65, 66, and 67 to the first fuel switching valve 61*f* and the second fuel switching valve 61*s* such that the fuel of the fuel type indicated by the fuel type command Cft is supplied to the combustor 31.

Next, an operation of the control device 100 will be described with reference to flowcharts illustrated in FIGS. 13 and 14.

Figure 13:
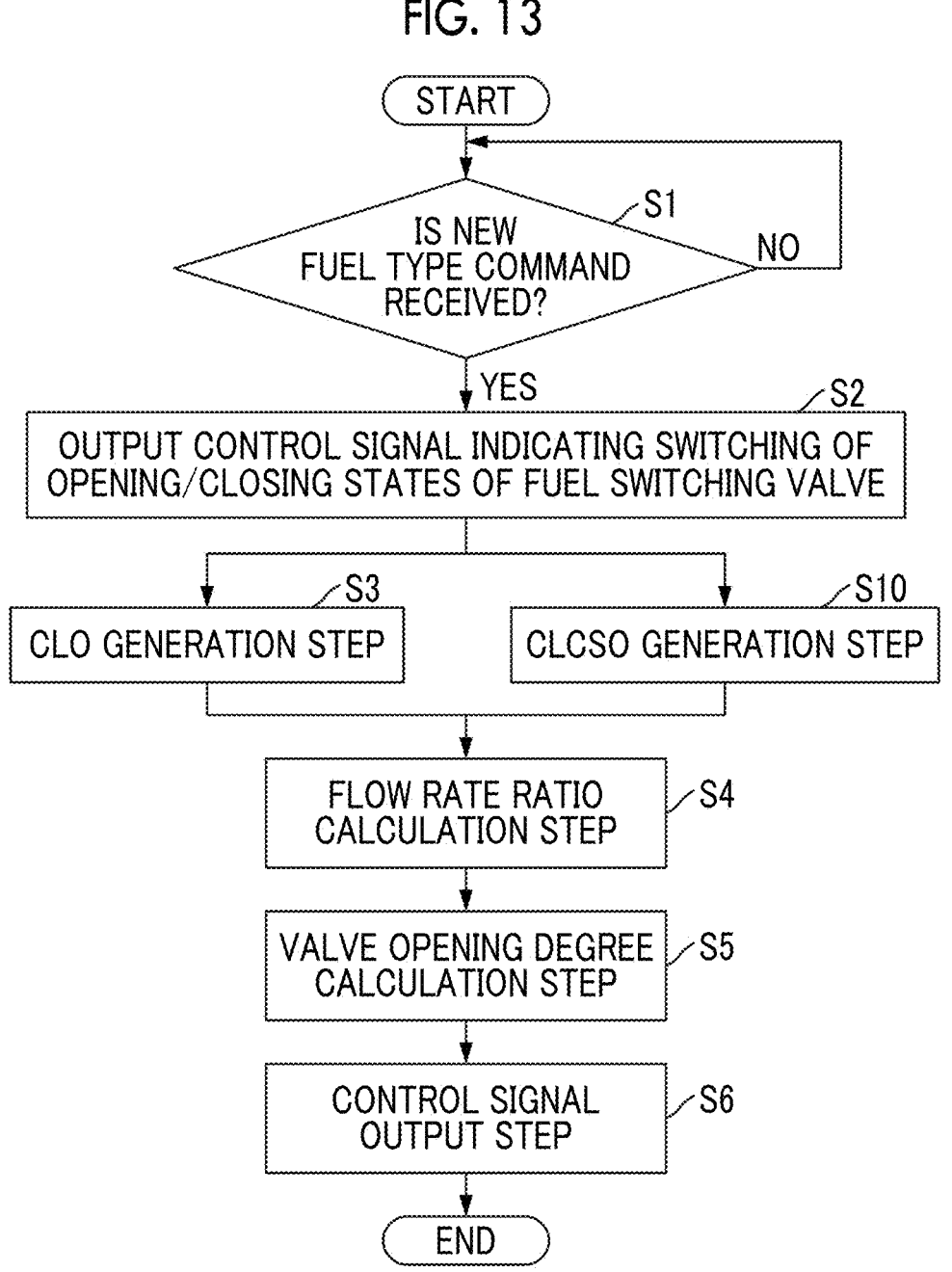
FIG. 13 is a flowchart illustrating an operation of the control device in the embodiment according to the present disclosure.
Figure 14:
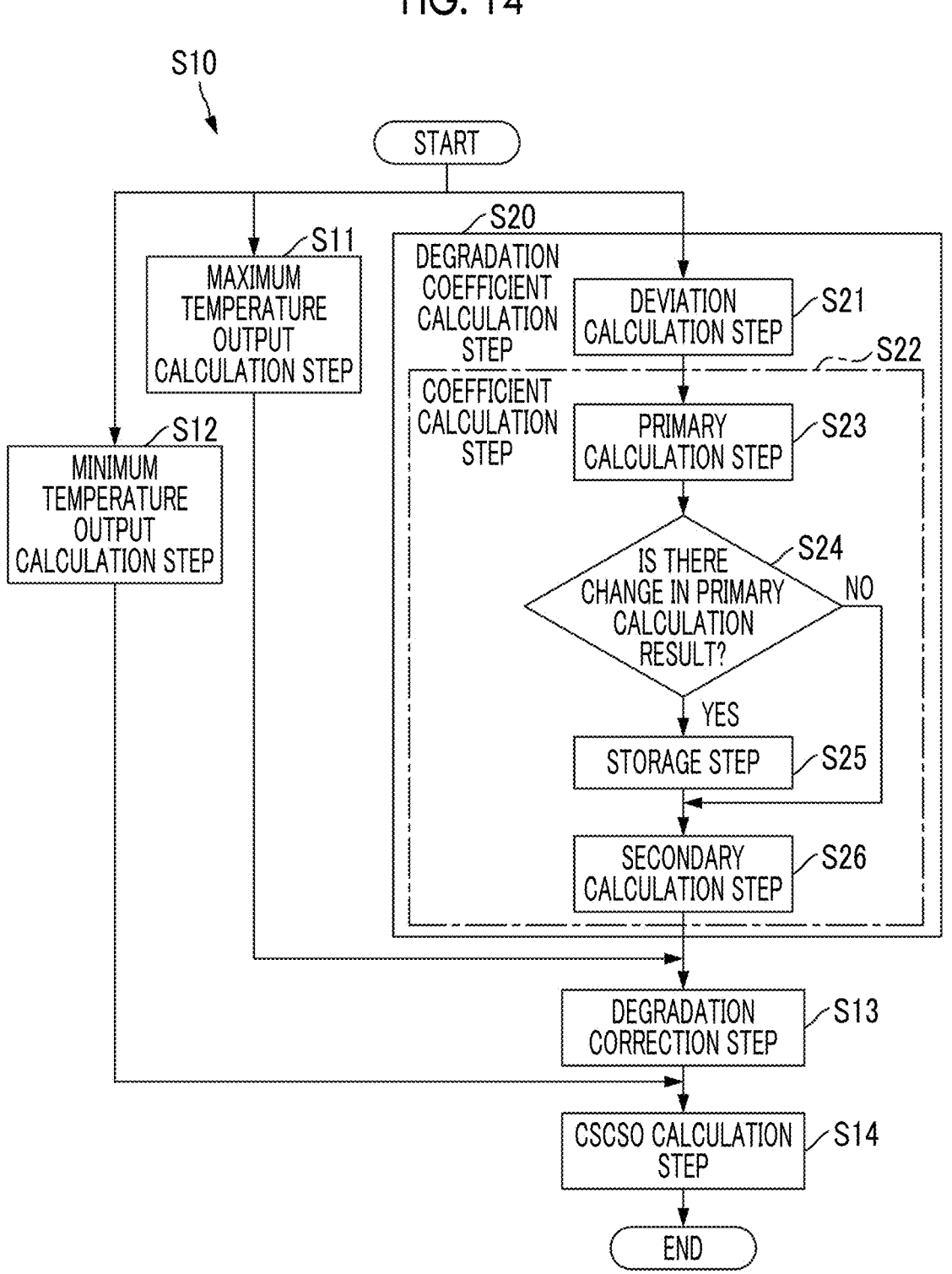
FIG. 14 is a flowchart illustrating an operation of the combustion load command generator in the embodiment according to the present disclosure.

As illustrated in the flowchart of FIG. 13, when the control device 100 receives the new fuel type command Cft indicating the fuel type different from the fuel type at the current time point (S1), the control signal output unit 190 of the control device 100 outputs a control signal indicating the switching of the opening/closing states of the fuel switching valves 61*f* and 61*s* to the first fuel switching valve 61*f* and the second fuel switching valve 61*s* such that the fuel of the fuel type indicated by the fuel type command Cft is supplied to the combustor 31 (S2). Specifically, when the fuel type at the current time point is the first fuel Ff and the fuel type indicated by the new fuel type command Cft is the second fuel Fs, the control signal output unit 190 outputs a control signal indicating a closing command to the first fuel switching valve 61*f*, and outputs a control signal indicating an opening command to the second fuel switching valve 61*s*.

Next, the fuel flow rate command generator 150 generates the fuel flow rate command value CSO of the fuel type indicated by the new fuel type command Cft (S3: fuel flow rate command generation step). For example, when the fuel type indicated by the new fuel type command Cft is the second fuel Fs, the second fuel flow rate command calculation unit 151*s* of the fuel flow rate command generator 150 generates the fuel flow rate command value CSO corresponding to the second fuel Fs. In addition, when the fuel type indicated by the new fuel type command Cft is the first fuel Ff, the first fuel flow rate command calculation unit 151*f* of the fuel flow rate command generator 150 generates the fuel flow rate command value CSO corresponding to the first fuel Ff.

When the temperature control starts to control the inlet temperature to be the inlet maximum temperature, the combustion load command generator 120 generates the combustion load command value CLCSO of the fuel type indicated by the new fuel type command Cft (S10: combustion load command generation step). For example, when the fuel type indicated by the new fuel type command Cft is the second fuel Fs, the second load command calculation unit 121*s* of the fuel flow rate command generator 150 generates the combustion load command value CLCSO corresponding to the second fuel Fs. In addition, when the fuel type indicated by the new fuel type command Cft is the first fuel Ff, the first load command calculation unit 121*f* of the fuel flow rate command generator 150 generates the combustion load command value CLCSO corresponding to the first fuel Ff.

The flow rate ratio calculator 160 obtains the pilot ratio PLr and the top hat ratio THr by using the combustion load command value CLCSO from the combustion load command generator 120, and outputs the ratios (S4: flow rate ratio calculation step). When the temperature control is not performed, the flow rate ratio calculator 160 outputs the scheduled pilot ratio PLr and the scheduled top hat ratio THr corresponding to an operation status of the gas turbine 10 at the current time point.

The valve opening degree calculator 170 obtains a flow rate Fpf of the pilot fuel Fp injected from the pilot nozzle 44, a flow rate Ftf of the top hat fuel Ft injected from the top hat nozzle 51, and a total flow rate Fmf of the main fuel Fm injected from the plurality of main nozzles 54, by using the fuel flow rate command value CSO indicating the total fuel flow rate, the pilot ratio PLr, and the top hat ratio THr. The valve opening degree calculator 170 outputs a command value indicating the valve opening degree of each of the fuel valves 65, 66, and 67, based on the flow rates Fpf, Ftf, and Fmf (S5: valve opening degree calculation step).

The control signal output unit 190 prepares a control signal indicating the valve opening degree command value for each of the fuel valves 65, 66, and 67 obtained by the valve opening degree calculator 170. The control signal output unit 190 outputs the control signal for each of the fuel valves 65, 66, and 67 to the corresponding fuel valves 65, 66, and 67 (S6: control signal output step).

Although not illustrated in the flowchart in FIG. 13, the IGV command generator 180 generates the IGV command value IGVc indicating the IGV opening degree, regardless of whether or not the new fuel type command is received. The control signal output unit 190 prepares the control signal for the IGV by using the IGV command value IGVc, and outputs the control signal to the IGV.

Next, details of a combustion load command generation step S10 by the combustion load command generator 120 will be described with reference to a flowchart illustrated in FIG. 14. Here, a case where the second load command calculation unit 121*s* of the combustion load command generator 120 generates the combustion load command value CLCSO corresponding to the second fuel Fs will be described.

First, the maximum temperature output calculation unit 131*s* of the second load command calculation unit 121*s* obtains the scheduled maximum temperature output 1,500° C. MW corresponding to the second fuel Fs (S11: maximum temperature output calculation step). In parallel with the maximum temperature output calculation step S11, the minimum temperature output calculation unit 136*s* of the second load command calculation unit 121*s* obtains the scheduled minimum temperature output 700° C. MW corresponding to the second fuel Fs (S12: minimum temperature output calculation step S12). Furthermore, in parallel with the maximum temperature output calculation step S11, the degradation coefficient calculation unit 124*s* of the second load command calculation unit 121*s* obtains the degradation coefficient k (S20: degradation coefficient calculation step).

The degradation coefficient calculation step S20 includes a deviation calculation step S21 and a coefficient calculation step S22. In the deviation calculation step S21, the differentiator 125*s* of the degradation coefficient calculation unit 124*s* obtains the deviation A between the actual output and the corrected maximum temperature output 1,500° C. MWr. In the coefficient calculation step S22, the divider 126*s*, the proportional integrator 127*s*, and the adder 129*s* of the degradation coefficient calculation unit 124*s* are operated to obtain the degradation coefficient k.

The coefficient calculation step S22 includes a primary calculation step S23, a determination step S24, a degradation parameter storage step S25, and a secondary calculation step S26.

In the primary calculation step S23, the divider 126*s* of the degradation coefficient calculation unit 124*s* divides the deviation A by the corrected maximum temperature output 1,500° C. MWr to obtain a ratio of the deviation A to the corrected maximum temperature output 1,500° C. MWr. Furthermore, in the primary calculation step S23, the proportional integrator 127*s* of the degradation coefficient calculation unit 124*s* determines whether or not the deviation A is equal to or greater than a predetermined threshold value when the temperature control is performed such that the inlet temperature is the inlet maximum temperature, as described above. When the proportional integrator 127*s* determines that the deviation A is equal to or greater than the predetermined threshold value during the temperature control, the proportional integrator 127*s* executes proportional integration processing on the output from the divider 126*s* to obtain the degradation parameter pm.

In the determination step S24, the proportional integrator 127*s* determines whether or not the degradation parameter pm which is a new proportional integration result value is changed with respect to the degradation parameter pm stored in the degradation parameter storage unit 127*ms*. When the proportional integrator 127*s* determines that the degradation parameter pm which is the new proportional integration result value is changed, the proportional integrator 127*s* stores the degradation parameter pm in the degradation parameter storage unit 127*ms* in the degradation parameter storage step S25.

In the secondary calculation step S26, the adder 129*s* adds a fixed value "1.0" to the degradation parameter pm stored in the degradation parameter storage unit 127*ms*, and outputs the value as the degradation coefficient k.

Next, the degradation correction unit 139*s* corrects the maximum temperature output 1,500° C. MW by multiplying the maximum temperature output 1.500° C. MW from the maximum temperature output calculation unit 131*s* by the degradation coefficient k (S13: degradation correction step). The maximum temperature output 1,500° C. MW after the correction in the degradation correction unit 139*s* is the corrected maximum temperature output 1,500° C. MWr.

Next, the combustion load command value calculation unit 140*s* executes the calculation expressed in the above-described Equation (1) by using the minimum temperature output 700° C. MW from the minimum temperature output calculation unit 136*s*, the corrected maximum temperature output 1,500° C. MWr from the degradation correction unit 139*s*, and the actual output, and prepares the combustion load command value CLCSO corresponding to the second fuel Fs (S14: combustion load command value calculation step).

Through the above-described steps, the combustion load command generation step S10 performed by the second load command calculation unit 121*s* of the combustion load command generator 120 is completed. Although a case where the combustion load command value CLCSO corresponding to the second fuel Fs is generated has been described above, when the combustion load command value CLCSO corresponding to the first fuel Ff is generated, the first load command calculation unit 121*f* is operated in the same manner as described above, and calculates the combustion load command value CLCSO corresponding to the first fuel Ff.

As described above, in the present embodiment, the combustion load command value CLCSO can be obtained in view of performance degradation of the gas turbine in both the case of using the first fuel Ff and the case of using the second fuel Fs. Therefore, in the present embodiment, the flow rate ratio for each of the plurality of fuel valves 65, 66, and 67 can be obtained in view of performance degradation of the gas turbine in both the case of using the first fuel Ff and the case of using the second fuel Fs. Therefore, in the present embodiment, in both the case of using the first fuel Ff and the case of using the second fuel Fs, even when performance of the gas turbine is degraded, the fuel can be stably combusted.

Meanwhile, immediately after the control device 100 receives the fuel type command Cft indicating the second fuel Fs, the second load command calculation unit 121*s* is operated as follows. When the temperature control is previously performed by using the second fuel Fs, the degradation coefficient calculation unit 124*s* of the second load command calculation unit 121*s* obtains the degradation coefficient k by using the degradation parameter pm stored in the degradation parameter storage unit 127*ms*. The degradation correction unit 139*s* of the second load command calculation unit 121*s* obtains the corrected maximum temperature output 1,500° C. MWr by multiplying the maximum temperature output 1,500° C. MW from the maximum temperature output calculation unit 131*s* of the second load command calculation unit 121*s* by the degradation coefficient k. Immediately after the control device 100 receives the fuel type command Cft indicating the second fuel Fs, the differentiator 125*s* and the divider 126*s* in the degradation coefficient calculation unit 124*s* of the second load command calculation unit 121*s* executes the calculation by using the corrected maximum temperature output 1,500° C. MWr.

As described above, in the present embodiment, immediately after the control device 100 receives the fuel type command Cft indicating the second fuel Fs, the degradation coefficient calculation unit 124*s* can obtain the degradation coefficient k by using the degradation parameter pm stored in the degradation parameter storage unit 127*ms*. Therefore, in the present embodiment, even immediately after the control device 100 receives the new fuel type command Cft, a degree of performance degradation of the gas turbine 10 when the fuel having the same combustion type is previously used can be reflected in the degradation coefficient k and the corrected maximum temperature output 1,500° C. MWr.

First Modification Example of Combustion Load Command Generator

A first modification example of the combustion load command generator will be described with reference to FIG. 15.

As in the combustion load command generator 120 in the above-described embodiment, a combustion load command generator 120*b* in the present modification example also includes a first load command calculation unit 121*fb* and a second load command calculation unit 121*sb*. Furthermore, as in the first load command calculation unit 121*f* and the second load command calculation unit 121*s* in the above-described embodiment, both the first load command calculation unit 121*fb* and the second load command calculation unit 121*sb* in the present modification example include standard atmospheric pressure generators 122*f* and 122*s*, intake air pressure ratio calculation units 123*f* and 123*s*, a degradation coefficient calculation unit 124, maximum temperature output calculation units 131*f* and 131*s*, minimum temperature output calculation units 136*f* and 136*s*, degradation correction units 139*f* and 139*s*, and combustion load command value calculation units 140*f* and 140*s*. However, the combustion load command generator 120*b* in the present modification example is different from the combustion load command generator 120 in the above-described embodiment in that the first load command calculation unit 121*fb* and the second load command calculation unit 121*sb* share the degradation coefficient calculation unit 124 with each other.

As in the degradation coefficient calculation unit of the above-described embodiment and the first modification example, the degradation coefficient calculation unit 124 in the present modification example includes the differentiator 125, the divider 126, the proportional integrator 127, the fixed value generator 128, and the adder 129. The proportional integrator 127 of the present modification example includes the degradation parameter storage unit 127*m*. Furthermore, the combustion load command generator 120*b* in the present modification example includes a maximum temperature output switch 148.

Figure 15:
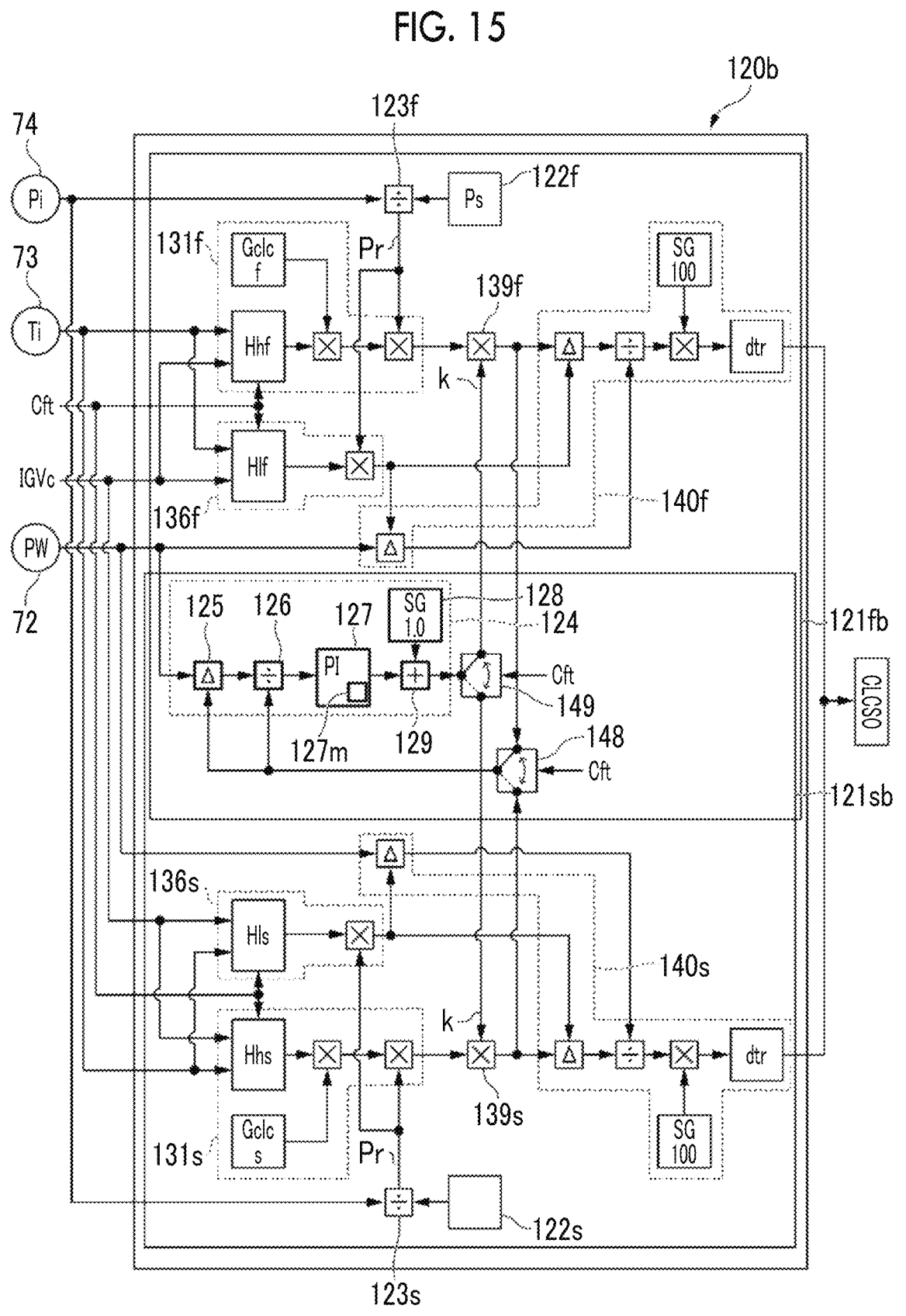

In addition, a functional unit indicated by a thick line in FIG. 15 indicates a functional unit shared between the first load command calculation unit 121*fb* and the second load command calculation unit 121*sb* in the present modification example.

In accordance with the fuel type command Cft, the maximum temperature output switch 148 outputs any one of the corrected maximum temperature outputs 1,500° C. MWr, out of the corrected maximum temperature output 1,500° C. MWr from the degradation correction unit 139*f* of the first load command calculation unit 121*fb* and the corrected maximum temperature output 1,500° C. MWr from the degradation correction unit 139*s* of the second load command calculation unit 121*sb*, to the degradation coefficient calculation unit 124.

When the maximum temperature output switch 148 in the present modification example receives the fuel type command Cft indicating the second fuel Fs, the maximum temperature output switch 148 outputs the corrected maximum temperature output 1,500° C. MWr from the degradation correction unit 139*s* of the second load command calculation unit 121*sb* to the degradation coefficient calculation unit 124. In addition, when the maximum temperature output switch 148 in the present modification example receives the fuel type command Cft indicating the first fuel Ff, the maximum temperature output switch 148 outputs the corrected maximum temperature output 1,500° C. MWr from the degradation correction unit 139*f* of the first load command calculation unit 121*fb* to the degradation coefficient calculation unit 124.

As described above, in the present modification example, the maximum temperature output switch 148 is provided. Therefore, even when the new fuel type command Cft is received, the corrected maximum temperature output 1,500° C. MWr corresponding to the fuel type command Cft out of the corrected maximum temperature output 1.500° C. MWr from the degradation correction unit 139*f* of the first load command calculation unit 121*fb* and the corrected maximum temperature output 1,500° C. MWr from the degradation correction unit 139*s* of the second load command calculation unit 121*sb* can be output to the degradation coefficient calculation unit 124.

Therefore, in the present modification example as well, as in the above-described embodiment, the combustion load command value CLCSO can be obtained in view of performance degradation of the gas turbine in both the case of using the first fuel Ff and the case of using the second fuel Fs.

In addition, in the present modification example, the first load command calculation unit 121*lfb* and the second load command calculation unit 121*sb* share the degradation coefficient calculation unit 124 with each other. Therefore, the number of functional units forming the combustion load command generator 120*b* in the present modification example can be reduced, compared to the number of functional units forming the combustion load command generator 120 in the above-described embodiment.

Second Modification Example of Combustion Load Command Generator

A second modification example of the combustion load command generator will be described with reference to FIG. 16.

A combustion load command generator 120*c* in the present modification example includes a standard atmospheric pressure generator 122, an intake air pressure ratio calculation unit 123, a degradation coefficient calculation unit 124, a maximum temperature output calculation unit 131, a minimum temperature output calculation unit 136, a degradation correction unit 139, and a combustion load command value calculation unit 140.

The standard atmospheric pressure generator 122*f* and the intake air pressure ratio calculation unit 123*f* of the first load command calculation unit 121*f* in the above-described embodiment and the standard atmospheric pressure generator 122*s* and the intake air pressure ratio calculation unit 123*s* of the second load command calculation unit 121*s* perform the same operations as each other even when the fuel type is changed. Therefore, the standard atmospheric pressure generator 122 and the intake air pressure ratio calculation unit 123 in the present modification example do not exist for each fuel type. Therefore, the standard atmospheric pressure generator 122 in the present modification example generates the same standard intake air pressure (standard atmospheric pressure) Ps even when the fuel type is changed. In addition, the intake air pressure ratio calculation unit 123 in the present modification example obtains an intake air pressure ratio Pr which is a ratio of an intake air pressure (atmospheric pressure) Pi detected by the intake air pressure gauge 74 to the above-described standard intake air pressure Ps, even when the fuel type is changed.

The degradation coefficient calculation unit 124*f* of the first load command calculation unit 121*f* and the degradation coefficient calculation unit 124*s* of the second load command calculation unit 121*s* in the above-described embodiment perform the same operations as each other even when the fuel type is changed. Therefore, the degradation coefficient calculation unit 124 in the present modification example does not exist for each fuel type. Therefore, the degradation coefficient calculation unit 124 in the present modification example executes the same calculation even when the fuel type is changed, and calculates the degradation coefficient k. As in the degradation coefficient calculation unit 124 of the second modification example, the degradation coefficient calculation unit 124 in the present modification example includes the differentiator 125, the divider 126, the proportional integrator 127, the fixed value generator 128, and the adder 129.

The degradation correction unit 139f of the first load command calculation unit 121f and the degradation correction unit 139 of the second load command calculation unit 121s in the above-described embodiment perform the same operations as each other even when the fuel type is changed. Therefore, the degradation correction unit 139 in the present modification example does not exist for each fuel type. Therefore, the degradation correction unit 139 in the present modification example executes the same calculation even when the fuel type is changed, and obtains the corrected maximum temperature output 1,500° C. MWr.

The combustion load command value calculation unit 140f of the first load command calculation unit 121f and the combustion load command value calculation unit 140s of the second load command calculation unit 121s in the above-described embodiment perform the same operations as each other even when the fuel type is changed. Therefore, the combustion load command value calculation unit 140 in the present modification example does not exist for each fuel type. Therefore, the combustion load command value calculation unit 140 in the present modification example executes the same calculation even w % ben the fuel type is changed, and obtains the combustion load command value CLCSO. As in the combustion load command value calculation units 140f and 140s in the above-described embodiment, the combustion load command value calculation unit 140 in the present modification example includes the first differentiator 141, the second differentiator 142, the divider 143, the fixed value generator 144, the multiplier 145, and the limiter 146.

The maximum temperature output calculation unit 131 in the present modification example includes a first planned maximum temperature output generator 132f, a second planned maximum temperature output generator 132s, a first machine difference correction coefficient generator 133f, a second machine difference correction coefficient generator 133s, a machine difference corrector 134, and an intake air pressure corrector 135.

The first planned maximum temperature output generator 132f obtains a planned maximum temperature output which is a planned gas turbine output when the inlet temperature is 1,500° C., by using the intake air temperature Ti and the IGV command value IGVc as variation parameters and by using the function Hhf corresponding to the first fuel Ff. Therefore, the first planned maximum temperature output generator 132f of the present modification example is substantially the same as the planned maximum temperature output generator 132f of the first load command calculation unit 121f in the above-described embodiment.

The second planned maximum temperature output generator 132s obtains a planned maximum temperature output which is a planned gas turbine output when the inlet temperature is 1,500° C., by using the intake air temperature Ti and the IGV command value IGVc as variation parameters and by using the function Hhs corresponding to the second fuel Fs. Therefore, the second planned maximum temperature output generator 132s of the present modification example is substantially the same as the planned maximum temperature output generator 132s of the second load command calculation unit 121s in the above-described embodiment.

When the fuel type command Cft is input to the first planned maximum temperature output generator 132f and the second planned maximum temperature output generator 132s, only the planned maximum temperature output generator corresponding to the fuel type indicated by the fuel type command Cft out of the first planned maximum temperature output generator 132f and the second planned maximum temperature output generator outputs the planned maximum temperature output.

The first machine difference correction coefficient generator 133f generates a machine difference correction coefficient obtained when a trial operation of the gas turbine is performed by using the first fuel Ff. Therefore, the first machine difference correction coefficient generator 133f in the present modification example is the same as the machine difference correction coefficient generator 133f of the first load command calculation unit 121f in the above-described embodiment.

The second machine difference correction coefficient generator 133s generates the machine difference correction coefficient obtained when a trial operation of the gas turbine is performed by using the second fuel Fs. Therefore, the second machine difference correction coefficient generator 133s in the present modification example is the same as the machine difference correction coefficient generator 133s of the second load command calculation unit 121s in the above-described embodiment.

The maximum temperature output calculation unit 131 in the present modification example further includes a machine difference correction coefficient switch 147. The machine difference correction coefficient switch 147 outputs the machine difference correction coefficient corresponding to the fuel type indicated by the fuel type command Cft, out of the machine difference correction coefficient from the first machine difference correction coefficient generator 133f and the machine difference correction coefficient from the second machine difference correction coefficient generator 133s.

The machine difference corrector 134 corrects the planned maximum temperature output by multiplying the planned maximum temperature output from the planned maximum temperature output generator corresponding to the fuel type indicated by the fuel type command Cft, out of the first planned maximum temperature output generator 132f and the second planned maximum temperature output generator 132s, by the machine difference correction coefficient from the machine difference correction coefficient switch 147. The intake air pressure corrector 135 further corrects the planned maximum temperature output after the machine difference correction, by multiplying the planned maximum temperature output after the machine difference correction, by the intake air pressure ratio Pr from the intake air pressure ratio calculation unit 123. The output from the intake air pressure corrector 135 is the scheduled maximum temperature output 1,500° C. MW corresponding to the fuel type indicated by the fuel type command Cft.

Therefore, the maximum temperature output calculation unit 131 in the present modification example has both functions of the maximum temperature output calculation unit 131f of the first load command calculation unit 121f in the above-described embodiment and the maximum temperature output calculation unit 131s of the second load command calculation unit 121s in the above-described embodiment.

The minimum temperature output calculation unit 136 in the present modification example includes a first planned minimum temperature output generator 137f, a second planned minimum temperature output generator 137s, and the intake air pressure corrector 138.

The first planned minimum temperature output generator 137f obtains the planned minimum temperature output which is the planned gas turbine output when the inlet temperature is 700° C., by using the intake air temperature Ti and the IGV command value IGVc as variation parameters and by using the function Hlf corresponding to the first fuel Ff. Therefore, the first planned minimum temperature output generator 137f of the present modification example is substantially the same as the planned minimum temperature output generator 137f of the first load command calculation unit 121f in the above-described embodiment.

The second planned minimum temperature output generator 137s obtains the planned minimum temperature output which is the planned gas turbine output when the inlet temperature is 700° C., by using the intake air temperature Ti and the IGV command value IGVc as variation parameters and by using the function His corresponding to the second fuel Fs. Therefore, the second planned minimum temperature output generator 137s of the present modification example is substantially the same as the planned minimum temperature output generator 137s of the second load command calculation unit 121s in the above-described embodiment.

When the fuel type command Cft is input to the first planned minimum temperature output generator 137f and the second planned minimum temperature output generator 137s, only the planned minimum temperature output generator corresponding to the fuel type indicated by the fuel type command Cft out of the first planned minimum temperature output generator 137f and the second planned minimum temperature output generator 137s outputs the planned minimum temperature output.

The intake air pressure corrector 138 corrects the planned minimum temperature output by multiplying the planned minimum temperature output from the planned minimum temperature output generator corresponding to the fuel type indicated by the fuel type command Cft, out of the first planned minimum temperature output generator 137f and the second planned minimum temperature output generator 137s, by the intake air pressure ratio Pr from the intake air pressure ratio calculation unit 123. The output from the intake air pressure corrector 138 is the scheduled minimum temperature output 700° C. MW corresponding to the fuel type indicated by the fuel type command Cft.

Therefore, the minimum temperature output calculation unit 136 in the present modification example has both functions of the minimum temperature output calculation unit 136f of the first load command calculation unit 121f in the above-described embodiment and the minimum temperature output calculation unit 136s of the second load command calculation unit 121s in the above-described embodiment.

As described above, as in the combustion load command generator 120 in the above-described embodiment, the combustion load command generator 120c in the present modification example also functionally includes the first load command calculation unit and the second load command calculation unit, and each of the load command calculation units includes the standard atmospheric pressure generator 122, the intake air pressure ratio calculation unit 123, the degradation coefficient calculation unit 124, the maximum temperature output calculation unit 131, the minimum temperature output calculation unit 136, the degradation correction unit 139, and the combustion load command value calculation unit 140.

Therefore, in the present modification example as well, as in the above-described embodiment and each of the above-described modification examples, the combustion load command value CLCSO can be obtained in view of performance degradation of the gas turbine in both the case of using the first fuel Ff and the case of using the second fuel Fs.

In addition, in the combustion load command generator 120c in the present modification example, the first load command calculation unit and the second load command calculation unit share the standard atmospheric pressure generator 122, the intake air pressure ratio calculation unit 123, the degradation coefficient calculation unit 124, a portion of the maximum temperature output calculation unit 131, a portion of the minimum temperature output calculation unit 136, the degradation correction unit 139, and the combustion load command value calculation unit 140 with each other.

In the present modification example, the number of functional units forming the combustion load command generator 120c can be reduced, compared to the number of functional units forming the combustion load command generators 120 and 120b in the above-described embodiment or the modification example.

Figure 16:
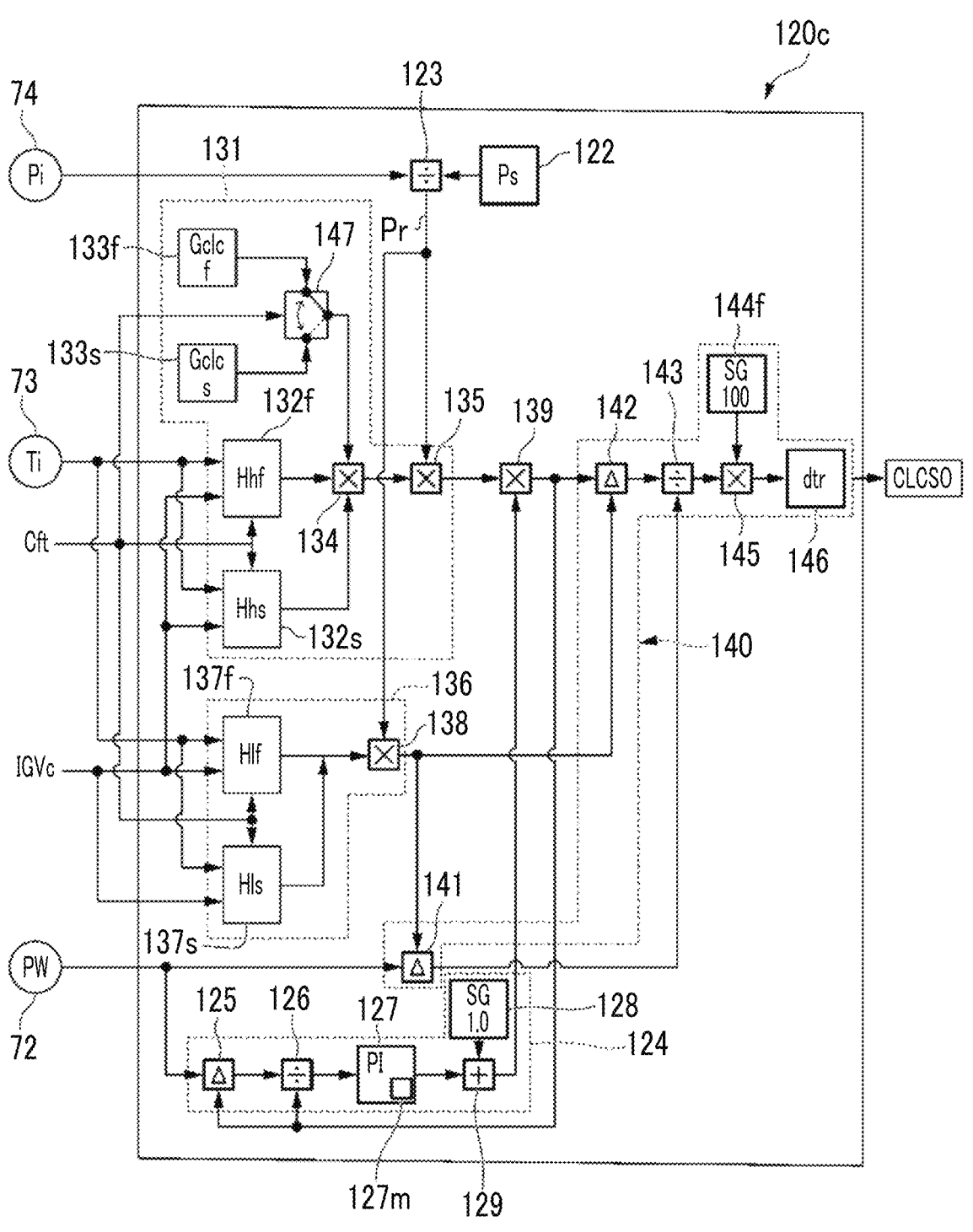
FIG. 16 is a functional block diagram of a combustion load command generator in a second modification example according to the present disclosure.

In addition, functional units indicated by thick lines in FIG. 16 indicate functional units shared between the first load command calculation unit and the second load command calculation unit in the present modification example.

Modification Example of Fuel Flow Rate Command Generator

Figure 17:
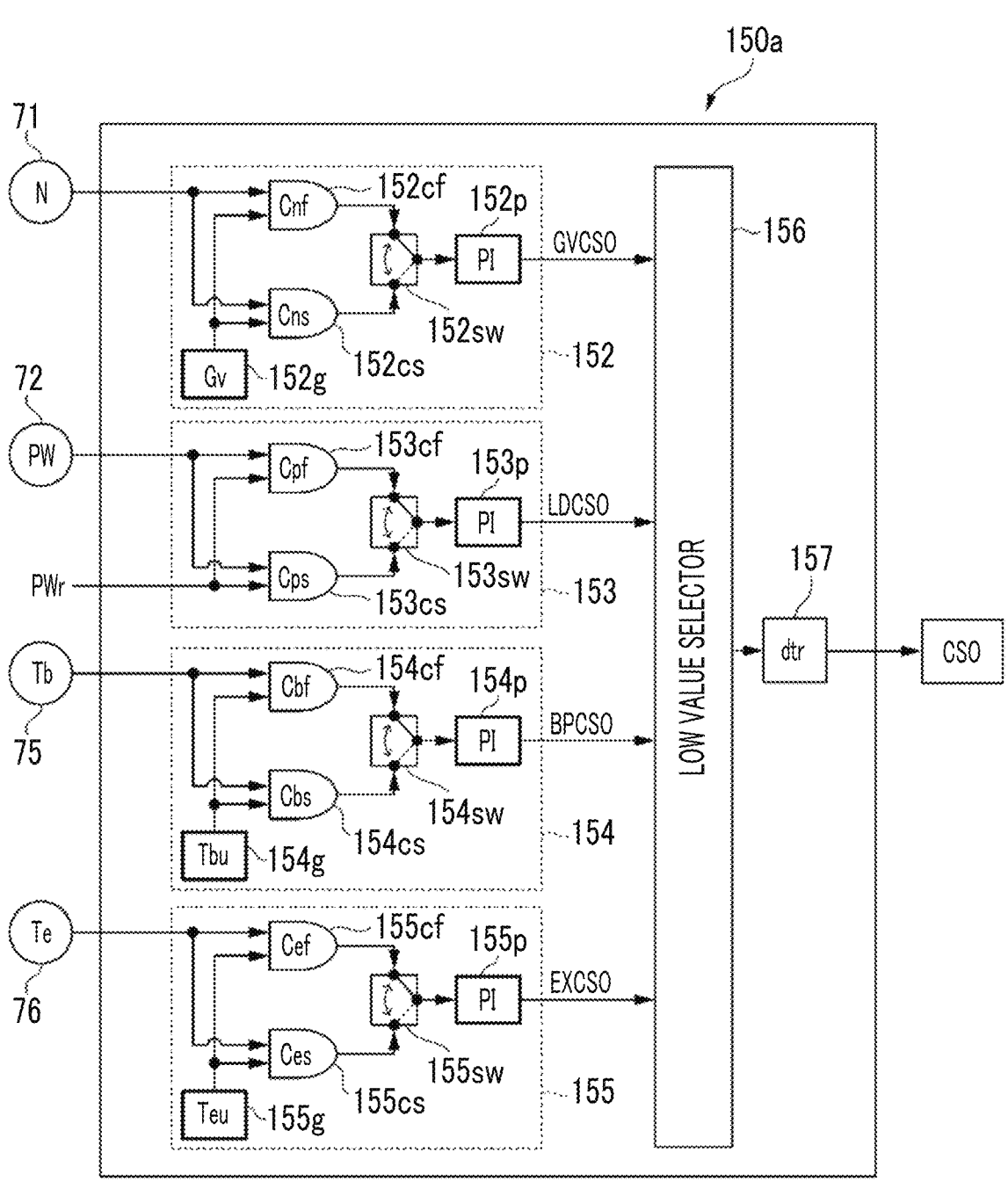
FIG. 17 is a functional block diagram of a fuel flow rate command generator in a modification example according to the present disclosure.

A modification example of the fuel flow rate command generator will be described with reference to FIG. 17.

A fuel flow rate command generator 150a in the present modification example includes a governor controller 152, a load controller 153, a blade path temperature controller 154, an exhaust gas temperature controller 155, a low value selector 156, and a limiter 157.

The governor controller 152 in the present modification example includes a target rotation speed generator 152g, a first rotation speed comparator 152cf, a second rotation speed comparator 152cs, a comparison value switch 152sw, and a proportional integrator 152p.

The target rotation speed generator 152g generates a target rotation speed Nt. The first rotation speed comparator 152cf compares the rotation speed N of the gas turbine rotor 28 from the rotation speed meter 71 with the target rotation speed Nt, and outputs a comparison value corresponding to the first fuel Ff. Therefore, the first rotation speed comparator 152cf is the same as the rotation speed comparator 152cf of the first fuel flow rate command calculation unit 151f in the above-described embodiment. The second rotation speed comparator 152cs compares the rotation speed N of the gas turbine rotor 28 from the rotation speed meter 71 with the target rotation speed Nt, and outputs a comparison value corresponding to the second fuel Fs. Therefore, the second rotation speed comparator 152cs is the same as the rotation speed comparator 152cs of the second fuel flow rate command calculation unit 151s in the above-described embodiment. The comparison value switch 152sw outputs the comparison value corresponding to the fuel type indicated by the fuel type command Cft, out of the comparison value from the first rotation speed comparator 152cf and the comparison value from the second rotation speed comparator 152cs. The proportional integrator 152p executes proportional integration calculation on the comparison value from the comparison value switch 152sw. The governor controller 152 outputs the output from the proportional integrator 152*p* as the command value GVCSO.

Therefore, the governor controller 152 in the present modification example has both functions of the governor controller 152*f* of the first fuel flow rate command calculation unit 151*f* in the above-described embodiment and the governor controller 152*s* of the second fuel flow rate command calculation unit 151*s* in the above-described embodiment.

The load controller 153 in the present modification example includes a first output comparator 153*cf*, a second output comparator 153*cs*, a comparison value switch 153*sw*, and a proportional integrator 153*p*.

The first output comparator 153*cf* compares the actual output PW of the gas turbine 10 from the output meter 72 with the required output PWr for the gas turbine 10 from a higher-level control device, and outputs the comparison value corresponding to the first fuel Ff. Therefore, the first output comparator 153*cf* is the same as the output comparator 153*cf* of the first fuel flow rate command calculation unit 151*f* in the above-described embodiment. The second output comparator 153*cs* compares the actual output PW of the gas turbine 10 from the output meter 72 with the required output PWr for the gas turbine 10 from the higher-level control device, and outputs the comparison value corresponding to the second fuel Fs. Therefore, the second output comparator 153*cs* is the same as the output comparator 153*cs* of the second fuel flow rate command calculation unit 151*s* in the above-described embodiment. The comparison value switch 153*sw* outputs the comparison value corresponding to the fuel type indicated by the fuel type command Cft, out of the comparison value from the first output comparator 153*cf* and the comparison value from the second output comparator 153*cs*. The proportional integrator 153*p* executes proportional integration calculation on the comparison value from the comparison value switch 153*sw*. The load controller 153 outputs the output from the proportional integrator 153*p* as the command value LDCSO.

Therefore, the load controller 153 in the present modification example has both functions of the load controller 153*f* of the first fuel flow rate command calculation unit 151*f* in the above-described embodiment and the load controller 153*s* of the second fuel flow rate command calculation unit 151*s* in the above-described embodiment.

The blade path temperature controller 154 in the present modification example includes an upper limit value generator 154*g*, a first blade path temperature comparator 154*cf*, a second blade path temperature comparator 154*cs*, a comparison value switch 154*sw*, and a proportional integrator 154*p*.

The upper limit value generator 154*g* generates an upper limit value Tbu of a blade path temperature. The first blade path temperature comparator 154*cf* compares the blade path temperature Tb from the blade path temperature sensor 75 with the upper limit value Thu, and outputs the comparison value corresponding to the first fuel Ff. Therefore, the first blade path temperature comparator 154*cf* is the same as the blade path temperature comparator 154*cf* of the first fuel flow rate command calculation unit 151*f* in the above-described embodiment. The second blade path temperature comparator 154*cs* compares the blade path temperature Tb from the blade path temperature sensor 75 with the upper limit value Thu, and outputs the comparison value corresponding to the second fuel Fs. Therefore, the second blade path temperature comparator 154*cs* is the same as the blade path temperature comparator 154*cs* of the second fuel flow rate command calculation unit 151*s* in the above-described embodiment. The comparison value switch 154*sw* outputs the comparison value corresponding to the fuel type indicated by the fuel type command Cft, out of the comparison value from the first blade path temperature comparator 154*cf* and the comparison value from the second blade path temperature comparator 154*cs*. The proportional integrator 154*p* executes proportional integration calculation on the comparison value from the comparison value switch 154*sw*. The blade path temperature controller 154 outputs the output from the proportional integrator 154*p* as the command value BPCSO.

Therefore, the blade path temperature controller 154 in the present modification example has both functions of the blade path temperature controller 154*f* of the first fuel flow rate command calculation unit 151*f* in the above-described embodiment and the blade path temperature controller 154*s* of the second fuel flow rate command calculation unit 151*s* in the above-described embodiment.

The exhaust gas temperature controller 155 in the present modification example includes an upper limit value generator 155*g*, a first exhaust gas temperature comparator 155*cf*, a second exhaust gas temperature comparator 155*cs*, a comparison value switch 155*sw*, and a proportional integrator 155*p*.

The upper limit value generator 155*g* generates the upper limit value Teu of the exhaust gas temperature. The first exhaust gas temperature comparator 155*cf* compares the exhaust gas temperature Te from the exhaust gas temperature sensor 76 with the upper limit value Teu, and outputs the comparison value corresponding to the first fuel Ff Therefore, the first exhaust gas temperature comparator 155*cf* is the same as the exhaust gas temperature comparator 155*cf* of the first fuel flow rate command calculation unit 151*f* in the above-described embodiment. The second exhaust gas temperature comparator 155*cs* compares the exhaust gas temperature Te from the exhaust gas temperature sensor 76 with the upper limit value Teu, and outputs the comparison value corresponding to the second fuel Fs. Therefore, the second exhaust gas temperature comparator 155*cs* is the same as the exhaust gas temperature comparator 155*cs* of the second fuel flow rate command calculation unit 151*s* in the above-described embodiment. The comparison value switch 155*sw* outputs the comparison value corresponding to the fuel type indicated by the fuel type command Cft, out of the comparison value from the first exhaust gas temperature comparator 155*cf* and the comparison value from the second exhaust gas temperature comparator 155*cs*. The proportional integrator 155*p* executes proportional integration calculation on the comparison value from the comparison value switch 155*sw*. The exhaust gas temperature controller 155 outputs the output from the proportional integrator 155*p* as the command value EXCSO.

Therefore, the exhaust gas temperature controller 155 in the present modification example has both functions of the exhaust gas temperature controller 155*f* of the first fuel flow rate command calculation unit 151*f* in the above-described embodiment and the function of the exhaust gas temperature controller 155*s* of the second fuel flow rate command calculation unit 151*s* in the above-described embodiment.

The low value selector 156*f* of the first fuel flow rate command calculation unit 151*f* in the above-described embodiment and the low value selector 156*s* of the second fuel flow rate command calculation unit 151*s* in the above-described embodiment perform the same operations as each other even w % ben the fuel type is changed. Therefore, the low value selector 156 in the present modification example does not exist for each fuel type.

The limiter 157_f_ of the first fuel flow rate command calculation unit 151_f_ in the above-described embodiment and the limiter 157_s_ of the second fuel flow rate command calculation unit 151_s_ in the above-described embodiment perform the same operations as each other even when the fuel type is changed. Therefore, the limiter 157 in the present modification example does not exist for each fuel type.

Therefore, as in the fuel flow rate command generator 150 in the above-described embodiment, the fuel flow rate command generator 150_a_ in the present modification example also functionally includes the first fuel flow rate command calculation unit and the second fuel flow rate command calculation unit, and each of the fuel flow rate command calculation units includes the governor controller 152, the load controller 153, the blade path temperature controller 154, the exhaust gas temperature controller 155, the low value selector 156, and the limiter 157. However, in the fuel flow rate command generator 150_a_ in the present modification example, the first fuel flow rate calculation unit and the second fuel flow rate calculation unit share the low value selector 156, the limiter 157, a portion of the governor controller 152, a portion of the load controller 153, a portion of the blade path temperature controller 154, and a portion of the exhaust gas temperature controller 155 with each other. Therefore, the number of functional units forming the fuel flow rate command generator 150_a_ in the present modification example can be reduced, compared to the number of functional units forming the fuel flow rate command generator 150 in the above-described embodiment.

The present modification example is a modification example of the fuel flow rate command generator 150 in the above-described embodiment. However, the fuel flow rate command generator 150_a_ in the present modification example may be adopted when any combustion load command generator of the combustion load command generator 120_b_ in the first modification example and the combustion load command generator 120_c_ in the second modification example is adopted.

Other Modification Examples

In the above-described embodiment and each of the above-described modification examples, the natural gas is used as an example of the first fuel Ff, and the oil is used as an example of the second fuel Fs. However, any one of the natural gas, the oil, the hydrogen, the combustible synthetic gas, and the ammonia, and a mixed fuel obtained by combining these fuels may be the first fuel Ff, and the other one may be the second fuel Fs.

In the above-described embodiment and each of the above-described modification examples, the fuel types are two types. However, the fuel types may be three or more types.

In addition, the present disclosure is not limited to the above-described embodiment and each of the above-described modification examples. Various additions, changes, replacements, or partial deletions can be made within the scope that does not deviate from the conceptual idea and the gist of the present invention derived from the contents defined in the scope of the appended claims and the equivalent thereof.

Additional Notes

The control device for the gas turbine equipment in the above-described embodiment and each of the above-described modification examples is understood as follows, for example.

(1) The control device 100 for the gas turbine equipment according to a first aspect is applied to the following gas turbine equipment.

This gas turbine equipment includes the gas turbine 10 including the compressor 11 that can compress the air to generate the compressed air, the combustor 31 that can generate the combustion gas by combusting the fuel in the compressed air, and the turbine 21 that can be driven by the combustion gas, and the plurality of types of fuel valves 65, 66, and 67 that regulate the flow rate of the fuel to be supplied to the combustor 31. The combustor 31 includes the plurality of types of nozzles 44, 51, and 54 that inject the fuel. Each of the plurality of types of fuel valves 65, 66, and 67 is provided for each of the plurality of types of nozzles 44, 51, and 54.

The control device 100 includes the combustion load command generators 120, 120_b_, and 120_c_ that obtain the combustion load command value CLCSO which is the parameter having the positive correlation with the inlet temperature which is the temperature of the combustion gas at the inlet of the turbine 21, the flow rate ratio calculator 160 that obtains the flow rate ratio of the fuel to be supplied to each of the plurality of types of nozzles 44, 51, and 54 in accordance with the combustion load command value CLCSO, the valve opening degree calculator 170 that obtains the valve opening degree of the fuel valves 65, 66, and 67 for each of the plurality of types of nozzles 44, 51, and 54, based on the flow rate ratio of the fuel to be supplied to each of the plurality of types of nozzles 44, 51, and 54, and the control signal output unit 190 that outputs the control signal indicating the valve opening degree to the fuel valves 65, 66, and 67 for each of the plurality of types of nozzles 44, 51, and 54.

The combustion load command generators 120, 120_b_, and 120_c_ include the first load command calculation units 121_f_ and 121_fb_ that obtain the combustion load command value CLCSO relating to the first fuel Ff which is the fuel type indicated by the fuel type command Cft from the outside, and the second load command calculation units 121_s_ and 121_sb_ that obtain the combustion load command value CLCSO relating to the second fuel Fs which is the fuel type indicated by the fuel type command Cft from the outside. All of the first load command calculation units 121_f_ and 121_fb_ and the second load command calculation units 121_s_ and 121_sb_ include the maximum temperature output calculation units 131_f_, 131_s_, and 131 that obtain the maximum temperature output which is the scheduled output corresponding to the fuel type, with respect to the inlet maximum temperature which is a maximum temperature at which the inlet temperature is determined in advance, the minimum temperature output calculation units 136_f_, 136_s_, and 136 that obtain the minimum temperature output which is the scheduled output corresponding to the fuel type, with respect to the inlet minimum temperature which is a minimum temperature at which the minimum temperature is determined in advance, the degradation coefficient calculation units 124_f_, 124_s_, and 124 that obtain the degradation coefficient k for correcting the maximum temperature output, the degradation correction units 139_f_, 139_s_, and 139 that correct the maximum temperature output by using the degradation coefficient k, and the combustion load command value calculation units 140_f_, 140_s_, and 140 that obtain the combustion load command value CLCSO by using the minimum temperature output, the corrected maximum temperature output 1,500° C. MWr which is the maximum temperature output corrected by the degradation correction units 139_f_, 139_s_, and 139, and the actual output which is an actual output of the gas turbine 10. The degradation coefficient calculation units 124*f*, 124*s*, and 124 include the differentiators 125*f*, 125*s*, and 125 that obtain the deviation A between the corrected maximum temperature output 1,500° C. MWr and the actual output, and the coefficient calculation unit that obtains the degradation coefficient k in accordance with the deviation A when the temperature control is performed such that the inlet temperature is the inlet maximum temperature. The coefficient calculation unit includes the degradation parameter storage units 127*mf*, 127*ms*, and 127*m* that store the degradation parameter pm which is the value obtained by executing proportional integration processing on the ratio of the deviation when the deviation A is equal to or greater than the predetermined threshold value during the temperature control. The coefficient calculation unit outputs the degradation coefficient k based on the degradation parameter pm stored in the degradation parameter storage units 127*mf*, 127*ms*, and 127*m*.

In the present aspect, the combustion load command value CLCSO can be obtained in view of performance degradation of the gas turbine 10 in both the case of using the first fuel Ff and the case of using the second fuel Fs. Therefore, in the present aspect, the flow rate ratio for each of the plurality of fuel valves 65, 66, and 67 can be obtained in view of performance degradation of the gas turbine 10 in both the case of using the first fuel Ff and the case of using the second fuel Fs. Therefore, in the present aspect, in both the case of using the first fuel Ff and the case of using the second fuel Fs, even when performance of the gas turbine 10 is degraded, the fuel can be stably combusted.

In addition, in the present aspect, even immediately after the control device 100 receives the fuel type command Cft indicating the combustion type different from the fuel type at the current time point, the degradation coefficient k can be obtained by using the degradation parameter pm stored in the degradation parameter storage units 127*mf*, 127*ms*, and 127*m*. Therefore, in the present aspect, even immediately after the control device 100 receives the new fuel type command Cft, the degree of performance degradation of the gas turbine 10 can be reflected in the degradation coefficient k, and the fuel can be stably combusted.

(2) As the control device 100 for the gas turbine according to a second aspect, in the control device 100 for the gas turbine equipment according to the first aspect, the first load command calculation unit 121*fb* and the second load command calculation unit 121*sb* share the degradation coefficient calculation unit 124 with each other.

In the present aspect, as in the second aspect, the first load command calculation unit 121*fb* and the second load command calculation unit 121*sb* share the degradation parameter storage unit 127*m*. Therefore, immediately after the new fuel type command Cft is received, a degree of performance degradation of the gas turbine 10 immediately before the fuel type command Cft is received can be reflected in the degradation coefficient k. Furthermore, in the present aspect, the first load command calculation unit 121*fb* and the second load command calculation unit 121*sb* share the degradation coefficient calculation unit 124 with each other. Therefore, the number of components of the control device 100 can be reduced.

(3) As the control device 100 for the gas turbine according to a third aspect, in the control device 100 for the gas turbine equipment according to the second aspect, the combustion load command generator 120*b* includes the maximum temperature output switch 148 that outputs any one of the corrected maximum temperature outputs 1,500° C. MWr out of the corrected maximum temperature output 1,500° C.

MWr from the degradation correction unit 139*f* of the first load command calculation unit 121*fb* and the corrected maximum temperature output 1,500° C. MWr from the degradation correction unit 139*s* of the second load command calculation unit 121*sb*, to the degradation coefficient calculation unit 124, in accordance with the fuel type indicated by the fuel type command Cft.

(4) As the control device 100 for the gas turbine according to a fourth aspect, in the control device 100 for the gas turbine equipment according to the third aspect, the first load command calculation unit 121*fb* and the second load command calculation unit 121*sb* share the degradation correction unit 139 and the combustion load command value calculation unit 140 with each other.

In the present aspect, the first load command calculation unit and the second load command calculation unit share the degradation correction unit 139 and the combustion load command value calculation unit 140 with each other. Therefore, the number of components of the control device 100 can be reduced.

The control program for the gas turbine equipment according to the above-described embodiment is understood as follows, for example.

(5) The control program 113*p* for the gas turbine equipment according to a fifth aspect is applied to the following gas turbine equipment.

This gas turbine equipment includes the gas turbine 10 including the compressor 11 that can compress the air to generate the compressed air, the combustor 31 that can generate the combustion gas by combusting the fuel in the compressed air, and the turbine 21 that can be driven by the combustion gas, and the plurality of types of fuel valves 65, 66, and 67 that regulate the flow rate of the fuel to be supplied to the combustor 31. The combustor 31 includes the plurality of types of nozzles 44, 51, and 54 that inject the fuel. Each of the plurality of types of fuel valves 65, 66, and 67 is provided for each of the plurality of types of nozzles 44, 51, and 54.

This control program causes the computer to execute the process including the combustion load command generation step S10 of obtaining the combustion load command value CLCSO which is the parameter having the positive correlation with the inlet temperature which is the temperature of the combustion gas at the inlet of the turbine 21, the flow rate ratio calculation step S4 of obtaining the flow rate ratio of the fuel to be supplied to each of the plurality of types of nozzles 44, 51, and 54 in accordance with the combustion load command value CLCSO, the valve opening degree calculation step S5 of obtaining the valve opening degree of the fuel valves 65, 66, and 67 for each of the plurality of types of nozzles 44, 51, and 54, based on the flow rate ratio of the fuel to be supplied to each of the plurality of types of nozzles 44, 51, and 54, and the control signal output step S6 of outputting the control signal indicating the valve opening degree to the fuel valves 65, 66, and 67 of each of the plurality of types of nozzles 44, 51, and 54.

The combustion load command generation step S10 includes the first load command calculation step of obtaining the combustion load command value CLCSO relating to the first fuel Ff which is the fuel type indicated by the fuel type command Cft from the outside, and the second load command calculation step of obtaining the combustion load command value CLCSO relating to the second fuel Fs which is the fuel type indicated by the fuel type command Cft from the outside. Both the first load command calculation step and the second load command calculation step include the maximum temperature output calculation step S11 of obtaining the maximum temperature output which is the scheduled output corresponding to the fuel type, with respect to the inlet maximum temperature which is the maximum temperature at which the inlet temperature is determined in advance, the minimum temperature output calculation step S12 of obtaining the minimum temperature output which is the scheduled output corresponding to the fuel type, with respect to the inlet minimum temperature which is the minimum temperature at which the inlet temperature is determined in advance, the degradation coefficient calculation step S20 of obtaining the degradation coefficient k for correcting the maximum temperature output, the degradation correction step S13 of correcting the maximum temperature output by using the degradation coefficient k, and the combustion load command value calculation step S14 of obtaining the combustion load command value CLCSO by using the minimum temperature output, the corrected maximum temperature output 1,500° C. MWr which is the maximum temperature output corrected in the degradation correction step S13, and the actual output which is an actual output of the gas turbine 10. The degradation coefficient calculation step S20 includes the deviation calculation step S21 of obtaining the deviation A between the corrected maximum temperature output 1,500° C. MWr and the actual output, and the coefficient calculation step S22 of obtaining the degradation coefficient k in accordance with the deviation A, when the temperature control is performed such that the inlet temperature is the inlet maximum temperature. The coefficient calculation step S22 includes the degradation parameter storage step S25 of storing the degradation parameter pm which is the value obtained by executing proportional integration processing on the ratio of the deviation when the deviation A is equal to or greater than the predetermined threshold value during the temperature control, in the degradation parameter storage units 127*mf*, 127*ms*, and 127*m* which are a portion of the storage area of the computer. In the coefficient calculation step S22, the degradation coefficient k is output, based on the degradation parameter pm stored in the degradation parameter storage units 127*mf*, 127*ms*, and 127*m* is output.

Since the computer is caused to execute the control program of the present aspect, as in the control device 100 in the first aspect, in both the case of using the first fuel Ff and the case of using the second fuel Fs, even when performance of the gas turbine 10 is degraded, the fuel can be stably combusted.

Furthermore, since the computer is caused to execute the control program of the present aspect, as in the control device 100 in the first aspect, even immediately after the new fuel type command Cft is received, the degree of performance degradation of the gas turbine 10 can be reflected in the degradation coefficient k, and the fuel can be stably combusted.

(6) As the control program 113*p* for the gas turbine equipment according to a sixth aspect, in the control program 113*p* for the gas turbine equipment according to the fifth aspect, the first load command calculation step and the second load command calculation step share the degradation coefficient calculation step with each other.

Since the computer is caused to execute the control program of the present aspect, as in the control device 100 in the second aspect, the degree of performance degradation of the gas turbine 10 immediately before the new fuel type command Cft is received can be reflected in the degradation coefficient k.

The method for operating the gas turbine equipment in the above-described embodiment is understood as follows, for example.

(7) The method for operating the gas turbine equipment according to a seventh aspect is applied to the following gas turbine equipment.

This gas turbine equipment includes the gas turbine 10 including the compressor 11 that can compress the air to generate the compressed air, the combustor 31 that can generate the combustion gas by combusting the fuel in the compressed air, and the turbine 21 that can be driven by the combustion gas, and the plurality of types of fuel valves 65, 66, and 67 that regulate the flow rate of the fuel to be supplied to the combustor 31. The combustor 31 includes the plurality of types of nozzles 44, 51, and 54 that inject the fuel. Each of the plurality of types of fuel valves 65, 66, and 67 is provided for each of the plurality of types of nozzles 44, 51, and 54.

This operating method includes the combustion load command generation step S10 of obtaining the combustion load command value CLCSO which is the parameter having the positive correlation with the inlet temperature which is the temperature of the combustion gas at the inlet of the turbine 21, the flow rate ratio calculation step S4 of obtaining the flow rate ratio of the fuel to be supplied to each of the plurality of types of nozzles 44, 51, and 54 in accordance with the combustion load command value CLCSO, the valve opening degree calculation step S5 of obtaining the valve opening degree of the fuel valves 65, 66, and 67 for each of the plurality of types of nozzles 44, 51, and 54, based on the flow rate ratio of the fuel to be supplied to each of the plurality of types of nozzles 44, 51, and 54, and the control signal output step S6 of outputting the control signal indicating the valve opening degree to the fuel valves 65, 66, and 67 for each of the plurality of types of nozzles 44, 51, and 54.

The combustion load command generation step S10 includes the first load command calculation step of obtaining the combustion load command value CLCSO relating to the first fuel Ff which is the fuel type indicated by the fuel type command Cft from the outside, and the second load command calculation step of obtaining the combustion load command value CLCSO relating to the second fuel Fs which is the fuel type indicated by the fuel type command Cft from the outside. Both the first load command calculation step and the second load command calculation step include the maximum temperature output calculation step S11 of obtaining the maximum temperature output which is the scheduled output corresponding to the fuel type, with respect to the inlet maximum temperature which is the maximum temperature at which the inlet temperature is determined in advance, the minimum temperature output calculation step S12 of obtaining the minimum temperature output which is the scheduled output corresponding to the fuel type, with respect to the inlet minimum temperature which is the minimum temperature at which the inlet temperature is determined in advance, the degradation coefficient calculation step S20 of obtaining the degradation coefficient k for correcting the maximum temperature output, the degradation correction step S13 of correcting the maximum temperature output by using the degradation coefficient k, and the combustion load command value calculation step S14 of obtaining the combustion load command value CLCSO by using the minimum temperature output, the corrected maximum temperature output 1,500° C. MWr which is the maximum temperature output corrected by the degradation correction units 139*f* and 139*s*, and the actual output which is an actual output of the gas turbine 10. The degradation coefficient calculation step S20 includes the deviation calculation step S21 of obtaining the deviation A between the corrected maximum temperature output 1,500° C. MWr and the actual output, and the coefficient calculation step S22 of obtaining the degradation coefficient k in accordance with the deviation A, when the temperature control is performed such that the inlet temperature is the inlet maximum temperature. The coefficient calculation step S22 includes the degradation parameter storage step S25 of storing the degradation parameter pm which is the value obtained by executing proportional integration processing on the ratio of the deviation when the deviation is equal to or greater than the predetermined threshold value during the temperature control, in the degradation parameter storage units 127*mf*, 127*ms*, and 127*m*. In the coefficient calculation step S22, the degradation coefficient k is output, based on the degradation parameter pm stored in the degradation parameter storage units 127*mf*, 127*ms*, and 127*m* is output.

In the present aspect as well, as in the control device 100 in the first aspect, in both the case of using the first fuel Ff and the case of using the second fuel Fs, even when performance of the gas turbine 10 is degraded, the fuel can be stably combusted.

Furthermore, in the present aspect as well, as in the control device 100 in the first aspect, even immediately after the new fuel type command Cft is received, the degree of performance degradation of the gas turbine 10 can be reflected in the degradation coefficient k, and the fuel can be stably combusted.

(8) As the method for operating the gas turbine equipment according to an eighth aspect, in the method for operating the gas turbine equipment according to the seventh aspect, the first load command calculation step and the second load command calculation step share the degradation coefficient calculation step with each other.

In the present aspect as well, as in the control device 100 in the second aspect, the degree of performance degradation of the gas turbine 10 immediately before the new fuel type command Cft is received can be reflected in the degradation coefficient k.

(9) As the method for operating the gas turbine equipment according to a ninth aspect, in the method for operating the gas turbine equipment according to the seventh aspect or the eighth aspect, any one of the natural gas, the oil, the hydrogen, the combustible synthetic gas, the ammonia, and the mixed fuel obtained by combining these fuels is the first fuel Ff, and the other one is the second fuel Fs.

INDUSTRIAL APPLICABILITY

According to an aspect of the present disclosure, when a plurality of types of fuels are used, even when performance of a gas turbine is degraded, a fuel can be stably combusted.

REFERENCE SIGNS LIST

10: gas turbine
11: compressor
12: compressor casing
13: compressor rotor
14: IGV
15: guide vane
16: driver
21: turbine
22: turbine casing

23: turbine rotor
28: gas turbine rotor
24: intermediate casing
25: exhaust casing
29: generator
31: combustor
32: outer cylinder
33: combustion cylinder (or transition piece)
41: fuel nozzle
42: inner cylinder
43: pilot burner
44: pilot nozzle
45: pilot air cylinder
48: pilot air flow path
49: diffusion flame
51: top hat nozzle
52: compressed air flow path
53: main burner
54: main nozzle
55: main air inner cylinder
56: main air outer cylinder
57: partition plate
58: main air flow path
59: premixed flame
60: integrated fuel line
60*f*: first fuel line
60*s*: second fuel line
61*f*: first fuel switching valve (fuel switching valve)
61*s*: second fuel switching valve (fuel switching valve)
62: pilot fuel line
63: main fuel line
64: top hat fuel line
65: pilot fuel valve
66: main fuel valve
67: top hat fuel valve
71: rotation speed meter
72: output meter
73: intake air temperature sensor
74: intake air pressure gauge
75: blade path temperature sensor
76: exhaust gas temperature sensor
100: control device
101: input device
102: display device
110: computer main body
111: CPU
112: main storage device
113: auxiliary storage device (storage area)
113*p*: control program
115: storage/reproduction device
116: input/output interface
117: device interface
118: communication interface
120, 120*b*, 120*c*: combustion load command generator
121*f*, 121*fb*: first load command calculation unit
121*s*, 121*sb*: second load command calculation unit
122*f*, 122*s*, 122: standard atmospheric pressure generator
123*f*, 123*s*, 123: intake air pressure ratio calculation unit
124*f*, 124*s*, 124: degradation coefficient calculation unit
125*f*, 125*s*, 125: differentiator
126*f*, 126*s*, 126: divider
127*f*, 127*s*, 127: proportional integrator
127*mf*, 127*ms*, 127*m*: degradation parameter storage unit
128*f*, 128*s*, 128: fixed value generator
129*f*, 129*s*, 129: adder
131*f*, 131*s*, 131: maximum temperature output calculation unit

132*f*: first planned maximum temperature output generator (planned maximum temperature output generator)

132*s*: second planned maximum temperature output generator (planned maximum temperature output generator)

133*f*: first machine difference correction coefficient generator (machine difference correction coefficient generator)

133*s*: second machine difference correction coefficient generator (machine difference correction coefficient generator)

134*f*, 134*s*, 134: machine difference corrector

135*f*, 135*s*, 135: intake air pressure corrector

136*f*, 136*s*, 136: minimum temperature output calculation unit

137*f*: first planned minimum temperature output generator (planned minimum temperature output generator)

137*s*: second planned minimum temperature output generator (planned minimum temperature output generator)

138*f*, 138*s*, 138: intake air pressure corrector

139*f*, 139*s*, 139: degradation correction unit

140*f*, 140*s*, 140: combustion load command value calculation unit

141*f*, 141*s*, 141: first differentiator

142*f*, 142*s*, 142: second differentiator

143*f*, 143*s*, 143: divider

144*f*, 144*s*, 144: fixed value generator

145*f*, 145*s*, 145: multiplier

146*f*, 146*s*, 146: limiter

147: machine difference correction coefficient switch

148: maximum temperature output switch

149: coefficient switch 150, 150*a*: fuel flow rate command generator

151*f*: first fuel flow rate command calculation unit

151*s*: second fuel flow rate command calculation unit

152*f*, 152*s*, 152: governor controller

152*gf*, 152*gs*, 152*g*: target rotation speed generator

152*cf*: first rotation speed comparator (rotation speed comparator)

152*cs*: second rotation speed comparator (rotation speed comparator)

152*pf*, 152*ps*, 152*p*: proportional integrator

152*sw*: comparison value switch

153*f*, 153*s*, 153: load controller

153*cf*: first output comparator (output comparator)

153*cs*: second output comparator (output comparator)

153*pf*, 153*ps*, 153*p*: proportional integrator

153*sw*: comparison value switch

154*f*, 154*s*, 154: blade path temperature controller

154*gf*, 154*gs*, 154*g*: upper limit value generator

154*cf*: first blade path temperature comparator (blade path temperature comparator)

154*cs*: second blade path temperature comparator (blade path temperature comparator)

154*pf*, 154*ps*, 154*p*: proportional integrator

154*sw*: comparison value switch

155*f*, 155*s*, 155: exhaust gas temperature controller

155*gf*, 155*gs*, 155*g*: upper limit value generator

155*cf*: first exhaust gas temperature comparator (exhaust gas temperature comparator)

155*cs*: second exhaust gas temperature comparator (exhaust gas temperature comparator)

155*pf*, 155*ps*, 155*p*: proportional integrator

155*sw*: comparison value switch

156*f*, 156*s*, 156: low value selector

157*f*, 157*s*, 157: limiter

38

160: flow rate ratio calculator

161: pilot ratio calculator

162: top hat ratio calculator

170: valve opening degree calculator

171: first multiplier

172: second multiplier

173: first subtractor

174: second subtractor

175: PL valve command value calculation unit

176: TH valve command value calculation unit

177: M valve command value calculation unit

180: IGV command generator

190: control signal output unit

The invention claimed is:

1. A control device for gas turbine equipment including a gas turbine including a compressor configured to compress air to generate compressed air, a combustor configured to generate combustion gas by combusting a fuel in the compressed air, and a turbine configured to be driven by the combustion gas, and a plurality of types of fuel valves configured to regulate a flow rate of the fuel to be supplied to the combustor, the combustor including a plurality of types of nozzles configured to inject the fuel, and each of the plurality of types of fuel valves being provided for each of the plurality of types of nozzles, the control device comprising:

a combustion load command generator configured to obtain a combustion load command value which is a parameter having a positive correlation with an inlet temperature which is a temperature of the combustion gas at an inlet of the turbine;

a flow rate ratio calculator configured to obtain a flow rate ratio of the fuel to be supplied to each of the plurality of types of nozzles in accordance with the combustion load command value;

a valve opening degree calculator configured to obtain a valve opening degree of each of the fuel valves for each of the plurality of types of nozzles, based on the flow rate ratio of the fuel to be supplied to each of the plurality of types of nozzles; and a control signal output unit configured to output a control signal indicating the valve opening degree to each of the fuel valves of each of the plurality of types of nozzles, wherein the combustion load command generator includes a first load command calculation unit configured to selectively obtain the combustion load command value when a fuel type command from an outside indicates that a fuel type of the fuel to be supplied to the combustor is a first fuel, and a second load command calculation unit configured to selectively obtain the combustion load command value when the fuel type command from the outside indicates that the fuel type of the fuel to be supplied to the combustor is a second fuel, wherein each of the first load command calculation unit and the second load command calculation unit includes a maximum temperature output calculation unit configured to obtain a maximum temperature output which is a scheduled output corresponding to the fuel type of the fuel to be supplied to the combustor, with respect to an inlet maximum temperature which is a maximum temperature at which the inlet temperature is determined in advance, a minimum temperature output calculation unit configured to obtain a minimum temperature output which is a scheduled output corresponding to the fuel type of the fuel to be supplied to the combustor, with respect to an inlet minimum temperature which is a minimum temperature at which the inlet temperature is determined in advance, a degradation coefficient calculation unit configured to obtain a degradation coefficient for correcting the maximum temperature output, a degradation correction unit configured to correct the maximum temperature output using the degradation coefficient, and a combustion load command value calculation unit configured to obtain the combustion load command value using the minimum temperature output, a corrected maximum temperature output which is the maximum temperature output corrected by the degradation correction unit, and an actual output of the gas turbine as detected by an output meter, wherein the degradation coefficient calculation unit includes a differentiator configured to obtain a deviation between the corrected maximum temperature output and the actual output, and a coefficient calculation unit configured to obtain the degradation coefficient in accordance with the deviation when temperature control is performed such that the inlet temperature is the inlet maximum temperature, wherein the coefficient calculation unit includes a degradation parameter storage unit configured to store a degradation parameter which is a value obtained by executing proportional integration processing on a ratio of the deviation when the deviation is equal to or greater than a predetermined threshold value during the temperature control, and wherein the coefficient calculation unit is configured to output the degradation coefficient, based on the degradation parameter stored in the degradation parameter storage unit.

2. A non-transitory computer-readable storage medium storing a control program for gas turbine equipment including a gas turbine including a compressor configured to compress air to generate compressed air, a combustor configured to generate combustion gas by combusting a fuel in the compressed air, and a turbine configured to be driven by the combustion gas, and a plurality of types of fuel valves configured to regulate a flow rate of the fuel to be supplied to the combustor, the combustor including a plurality of types of nozzles configured to inject the fuel, and each of the plurality of types of fuel valves being provided for each of the plurality of types of nozzles, the control program causing a computer to execute a process comprising:

a combustion load command generation step of obtaining a combustion load command value which is a parameter having a positive correlation with an inlet temperature which is a temperature of the combustion gas at an inlet of the turbine;

a flow rate ratio calculation step of obtaining a flow rate ratio of the fuel to be supplied to each of the plurality of types of nozzles in accordance with the combustion load command value;

a valve opening degree calculation step of obtaining a valve opening degree of each of the fuel valves for each of the plurality of types of nozzles, based on the flow rate ratio of the fuel to be supplied to each of the plurality of types of nozzles; and a control signal output step of outputting a control signal indicating the valve opening degree to each of the fuel valves of each of the plurality of types of nozzles, wherein the combustion load command generation step includes a first load command calculation step of selectively obtaining the combustion load command value when a fuel type command from an outside indicates that a fuel type of the fuel to be supplied to the combustor is a first fuel, and a second load command calculation step of selectively obtaining the combustion load command value when the fuel type command from the outside indicates that the fuel type of the fuel to be supplied to the combustor is a second fuel, wherein each of the first load command calculation step and the second load command calculation step includes a maximum temperature output calculation step of obtaining a maximum temperature output which is a scheduled output corresponding to the fuel type of the fuel to be supplied to the combustor, with respect to an inlet maximum temperature which is a maximum temperature at which the inlet temperature is determined in advance, a minimum temperature output calculation step of obtaining a minimum temperature output which is a scheduled output corresponding to the fuel type of the fuel to be supplied to the combustor, with respect to an inlet minimum temperature which is a minimum temperature at which the inlet temperature is determined in advance, a degradation coefficient calculation step of obtaining a degradation coefficient for correcting the maximum temperature output, a degradation correction step of correcting the maximum temperature output using the degradation coefficient, and a combustion load command value calculation step of obtaining the combustion load command value using the minimum temperature output, a corrected maximum temperature output which is the maximum temperature output corrected in the degradation correction step, and an actual output of the gas turbine as detected by an output meter, wherein the degradation coefficient calculation step includes a deviation calculation step of obtaining a deviation between the corrected maximum temperature output and the actual output, and a coefficient calculation step of obtaining the degradation coefficient in accordance with the deviation when temperature control is performed such that the inlet temperature is the inlet maximum temperature, wherein the coefficient calculation step includes a degradation parameter storage step of storing, in a degradation parameter storage unit, a degradation parameter which is a value obtained by executing proportional integration processing on a ratio of the deviation when the deviation is equal to or greater than a predetermined threshold value during the temperature control, the degradation parameter storage unit being a portion of a storage area of the computer, and wherein, in the coefficient calculation step, the degradation coefficient is output, based on the degradation parameter stored in the degradation parameter storage unit.

3. A method for operating gas turbine equipment including a gas turbine including a compressor configured to compress air to generate compressed air, a combustor configured to generate combustion gas by combusting a fuel in the compressed air, and a turbine configured to be driven by the combustion gas, and a plurality of types of fuel valves configured to regulate a flow rate of the fuel to be supplied to the combustor, the combustor including a plurality of types of nozzles configured to inject the fuel, and each of the plurality of types of fuel valves being provided for each of the plurality of types of nozzles, the method comprising:

a combustion load command generation step of obtaining a combustion load command value which is a parameter having a positive correlation with an inlet temperature which is a temperature of the combustion gas at an inlet of the turbine;

a flow rate ratio calculation step of obtaining a flow rate ratio of the fuel to be supplied to each of a plurality of types of nozzles in accordance with the combustion load command value;

a valve opening degree calculation step of obtaining a valve opening degree of each of the fuel valves for each of the plurality of types of nozzles, based on the flow rate ratio of the fuel to be supplied to each of the plurality of types of nozzles; and a control signal output step of outputting a control signal indicating the valve opening degree to each of the fuel valves of each of the plurality of types of nozzles, wherein the combustion load command generation step includes a first load command calculation step of selectively obtaining the combustion load command value when a fuel type command from an outside indicates that a fuel type of the fuel to be supplied to the combustor is a first fuel, and a second load command calculation step of selectively obtaining the combustion load command value when the fuel type command from the outside indicates that the fuel type of the fuel to be supplied to the combustor is a second fuel, wherein each of the first load command calculation step and the second load command calculation step includes a maximum temperature output calculation step of obtaining a maximum temperature output which is a scheduled output corresponding to the fuel type of the fuel to be supplied to the combustor, with respect to an inlet maximum temperature which is a maximum temperature at which the inlet temperature is determined in advance, a minimum temperature output calculation step of obtaining a minimum temperature output which is a scheduled output corresponding to the fuel type of the fuel to be supplied to the combustor, with respect to an inlet minimum temperature which is a minimum temperature at which the inlet temperature is determined in advance, a degradation coefficient calculation step of obtaining a degradation coefficient for correcting the maximum temperature output, a degradation correction step of correcting the maximum temperature output using the degradation coefficient, and a combustion load command value calculation step of obtaining the combustion load command value using the minimum temperature output, a corrected maximum temperature output which is the maximum temperature output corrected in the degradation correction step, and an actual output of the gas turbine as detected by an output meter, wherein the degradation coefficient calculation step includes a deviation calculation step of obtaining a deviation between the corrected maximum temperature output and the actual output, and a coefficient calculation step of obtaining the degradation coefficient in accordance with the deviation when temperature control is performed such that the inlet temperature is the inlet maximum temperature, wherein the coefficient calculation step includes a degradation parameter storage step of storing, in a degradation parameter storage unit, a degradation parameter which is a value obtained by executing proportional integration processing on a ratio of the deviation when the deviation is equal to or greater than a predetermined threshold value during the temperature control, and wherein, in the coefficient calculation step, the degradation coefficient is output, based on the degradation parameter stored in the degradation parameter storage unit.

4. The method according to claim 3, wherein:

the first fuel is: (i) any one of a natural gas, an oil, hydrogen, a combustible synthetic gas, or ammonia; or (ii) a mixed fuel obtained by combining at least two of the natural gas, the oil, the hydrogen, the combustible synthetic gas, or the ammonia; and the second fuel is different than the first fuel and is a different one of the natural gas, the oil, the hydrogen, the combustible synthetic gas, the ammonia, or the mixed fuel.

5. A control device for gas turbine equipment including a gas turbine including a compressor configured to compress air to generate compressed air, a combustor configured to generate combustion gas by combusting a fuel in the compressed air, and a turbine configured to be driven by the combustion gas, and a plurality of types of fuel valves configured to regulate a flow rate of the fuel to be supplied to the combustor, the combustor including a plurality of types of nozzles configured to inject the fuel, and each of the plurality of types of fuel valves being provided for each of the plurality of types of nozzles, the control device comprising:

a combustion load command generator configured to obtain a combustion load command value which is a parameter having a positive correlation with an inlet temperature which is a temperature of the combustion gas at an inlet of the turbine;

a flow rate ratio calculator configured to obtain a flow rate ratio of the fuel to be supplied to each of the plurality of types of nozzles in accordance with the combustion load command value;

a valve opening degree calculator configured to obtain a valve opening degree of each of the fuel valves for each of the plurality of types of nozzles, based on the flow rate ratio of the fuel to be supplied to each of the plurality of types of nozzles; and a control signal output unit configured to output a control signal indicating the valve opening degree to each of the fuel valves of each of the plurality of types of nozzles, wherein the combustion load command generator includes a first load command calculation unit configured to selectively obtain the combustion load command value when a fuel type command from an outside indicates that a fuel type of the fuel to be supplied to the combustor is a first fuel, a second load command calculation unit configured to selectively obtain the combustion load command value when the fuel type command from the outside indicates that the fuel type of the fuel to be supplied to the combustor is a second fuel, and a degradation coefficient calculation unit configured to obtain a degradation coefficient, the degradation coefficient calculation unit being common to the first load command calculation unit and the second load command calculation unit, wherein each of the first load command calculation unit and the second load command calculation unit includes a maximum temperature output calculation unit configured to obtain a maximum temperature output which is a scheduled output corresponding to the fuel type of the fuel to be supplied to the combustor, with respect to an inlet maximum temperature which is a maximum temperature at which the inlet temperature is determined in advance, a minimum temperature output calculation unit configured to obtain a minimum temperature output which is a scheduled output corresponding to the fuel type of the fuel to be supplied to the combustor, with respect to an inlet minimum temperature which is a minimum temperature at which the inlet temperature is determined in advance, a degradation correction unit configured to correct the maximum temperature output using the degradation coefficient, and a combustion load command value calculation unit configured to obtain the combustion load command value using the minimum temperature output, a corrected maximum temperature output which is the maximum temperature output corrected by the degradation correction unit, and an actual output of the gas turbine as detected by an output meter, wherein the degradation coefficient calculation unit includes a differentiator configured to obtain a deviation between the corrected maximum temperature output and the actual output, and a coefficient calculation unit configured to obtain the degradation coefficient in accordance with the deviation when temperature control is performed such that the inlet temperature is the inlet maximum temperature, wherein the coefficient calculation unit includes a degradation parameter storage unit configured to store a degradation parameter which is a value obtained by executing proportional integration processing on a ratio of the deviation when the deviation is equal to or greater than a predetermined threshold value during the temperature control, and wherein the coefficient calculation unit is configured to output the degradation coefficient, based on the degradation parameter stored in the degradation parameter storage unit.

6. The control device according to claim 5, wherein the combustion load command generator includes a maximum temperature output switch configured to output, to the degradation coefficient calculation unit: (i) the corrected maximum temperature output from the first load command calculation unit when the fuel type command from the outside indicates that the fuel type of the fuel to be supplied to the combustor is the first fuel; and (ii) the corrected maximum temperature output from the second load command calculation unit when the fuel type command from the outside indicates that the fuel type of the fuel to be supplied to the combustor is the second fuel.

* * * * *